(12) United States Patent
Kato et al.

(10) Patent No.: US 6,724,992 B2
(45) Date of Patent: Apr. 20, 2004

(54) FINDER AND CAMERA USING SUCH FINDER

(75) Inventors: Yumiko Kato, Kanagawa (JP); Akihiro Nishio, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/346,150

(22) Filed: Jan. 16, 2003

(65) Prior Publication Data

US 2003/0165336 A1 Sep. 4, 2003

(30) Foreign Application Priority Data

Jan. 17, 2002 (JP) ........................................ 2002-008704

(51) Int. Cl.[7] ................... G03B 13/10; G03B 13/06; G03B 13/02; G03B 13/08; G02B 15/14
(52) U.S. Cl. ................... 396/379; 396/382; 396/384; 396/386; 359/687
(58) Field of Search ................... 396/379, 373, 396/84, 141, 148, 382, 384, 385, 386; 359/687, 643, 644, 686, 422, 647, 676, 693, 423, 424, 646, 432, 740, 674, 683

(56) References Cited

U.S. PATENT DOCUMENTS

| | | | |
|---|---|---|---|
| 4,842,395 A | 6/1989 | Sato et al. | 359/380 |
| 4,992,809 A | 2/1991 | Nozaki et al. | 396/84 |
| 5,095,326 A | 3/1992 | Nozaki et al. | 396/384 |
| 5,193,030 A | 3/1993 | Nozaki et al. | 359/687 |
| 5,225,927 A | 7/1993 | Nozaki et al. | 359/355 |
| RE35,600 E | 9/1997 | Nozaki et al. | 396/84 |
| 5,694,244 A | 12/1997 | Abe et al. | 359/432 |
| 5,748,381 A | 5/1998 | Ono | 359/647 |
| 6,038,069 A | * 3/2000 | Yamaguchi | 359/432 |
| 6,324,018 B1 | * 11/2001 | Kawamura | 359/687 |
| 6,331,917 B1 | * 12/2001 | Ishii et al. | 359/687 |

FOREIGN PATENT DOCUMENTS

| | | |
|---|---|---|
| JP | 01-116616 | 5/1989 |
| JP | 08-122856 | 5/1996 |
| JP | 11-281889 | 10/1999 |

* cited by examiner

*Primary Examiner*—Russell Adams
*Assistant Examiner*—Rochelle Blackman
(74) *Attorney, Agent, or Firm*—Morgan & Finnegan, LLP

(57) ABSTRACT

A compact finder with excellent optical performance, and a camera including the finder are disclosed. The finder of the present invention includes an objective optical system, and an eyepiece optical system. The objective optical system includes, from an object side to an image side, a first lens unit having positive power, a second lens unit having negative power, a third lens unit having positive power, and a fourth lens unit having positive power. During zooming from a wide-angle end to a telephoto end, the second lens unit is moved toward the image side, the third lens unit is moved toward the object side, and the fourth lens unit is moved such that an air space between the fourth lens unit and the third lens unit is changed. The camera of the present invention includes a photo-taking optical system, and the finder of the present invention whose optical axis is different from an optical axis of the photo-taking optical system.

11 Claims, 30 Drawing Sheets

FINDER AND CAMERA USING SUCH FINDER

BACKGROUND OF THE INVENTION

1. Field of the Invention

The present invention relates to a view finder, and an optical apparatus incorporating the finder. More particularly, the invention relates to an external finder provided separately from a photo-taking optical system, in which a preferable finder image can be observed by appropriately designing lens structures of its objective optical system, its eyepiece optical system, and the like. The finder of the present invention is preferably usable in optical apparatuses, such as a still camera, a video camera, a digital camera, and a film camera.

2. Related Background Art

In a conventional camera with separately constructed photo-taking optical system and finder system, the finder system is also constructed as a zoom system when the photo-taking system is a zoom system, and a field magnification of the finder is changed in conformity with zooming of the photo-taking system. Generally, the structure of the zoom finder is required to be small in size and readily attain a desired zoom ratio since it is incorporated into a camera.

The Assignee of the present invention proposed the following real image type zoom finders in Japanese Patent Laid-Open Nos. 61(1986)-156018 (its U.S. counterpart is U.S. Pat. No. 4,842,395) and 1(1989)-116616, for example. In those zoom finders, its objective lens system is composed of plural lens units, zooming is performed by changing air spaces between the lens units, an object image with varying magnification formed by the objective lens system is converted to an erecting image by an image inverting member, such as a Porro prism, and the erecting image is observed by an eyepiece optical system.

In recent lens-shutter cameras, the zoom ratio of a photo-taking optical system tends to increase. Further, the size of a camera body is required to be small even when the zoom ratio of the photo-taking optical system is increased. Accordingly, the zoom ratio of a finder installed in the camera is also required to increase, and its size is desired to be small.

As a finder for achieving both of high zoom ratio and small size, there have been proposed finders with an objective optical system composed of plural lens units of positive power, negative power and positive power.

In Japanese Patent Laid-Open Nos. 2(1990)-173713 (its U.S. counterparts are U.S. Pat. Nos. 4,992,809, 5,095,326, 5,193,030, 5,225,927, and R.E.35,600), 8(1996)-43885 (its U.S. counterpart is U.S. Pat. No. 5,694,244), for example, the objective optical system includes, in the order from the object side, lens units of positive power, negative power and positive power, second and third units are moved during zooming. Further, in Japanese Patent Laid-Open No. 8(1996)-122857 (its U.S. counterpart is U.S. Pat. No. 5,748,381), the objective optical system includes, in the order from the object side, lens units of positive power, negative power, positive power and positive power, zooming is performed by the second unit, diopter accompanying the zooming is corrected by movement of the fourth unit, and the third unit remains stationary. Furthermore, in Japanese Patent Laid-Open Nos. 8(1996)-122856 and 11(1999)-281889, for example, the Assignee of the present invention proposed a zoom finder including an objective optical system composed of lens units of positive power, negative power and positive power in the order from the object side.

In the above-discussed structures in which two lens units are moved during the zooming, one of the two movable units performs most part of the zooming operation while the other moves to correct variation of the diopter accompanying the zooming.

In those zoom finders, when the zoom ratio is intended to be increased, amounts of movement of the two movable lens units need to be increased, leading to an increase in size of the entire lens system. Further, when the zoom ratio is increased while the size of the entire lens system remains small, the power of each lens unit only needs to be strengthened. However, if the power is simply strengthened, variation of aberrations during the zooming increase. Particularly, correction of aberrations of out-of-axis light rays becomes difficult. Accordingly, it becomes difficult to observe a preferable finder image over an overall zoom range.

SUMMARY OF THE INVENTION

It is an object of the present invention to provide a compact real image type finder in which a preferable finder image can be observed over an overall zoom range due to an appropriately-designed lens construction of an objective lens system including a zooming portion, and an optical apparatus incorporating the finder.

In one aspect, a finder of the present invention includes an objective optical system which includes, from an object side to an image side, a first lens unit having positive power, a second lens unit having negative power, a third lens unit having positive power, and a fourth lens unit having positive power; and an eyepiece optical system; wherein, when zooming is performed from a wide-angle end to a telephoto end, the second lens unit is moved toward the image side, the third lens unit is moved toward the object side, and the fourth lens unit is moved such that an air space between the fourth lens unit and the third lens unit is changed.

In another aspect, a camera of the present invention includes a photo-taking optical system, and a finder of the present invention whose optical axis is different from an optical axis of the photo-taking optical system.

These and further aspects and features of the invention will become apparent from the following detailed description of preferred embodiments thereof in conjunction with the accompanying drawings.

DESCRIPTION OF THE PREFERRED EMBODIMENTS

Figure 1:
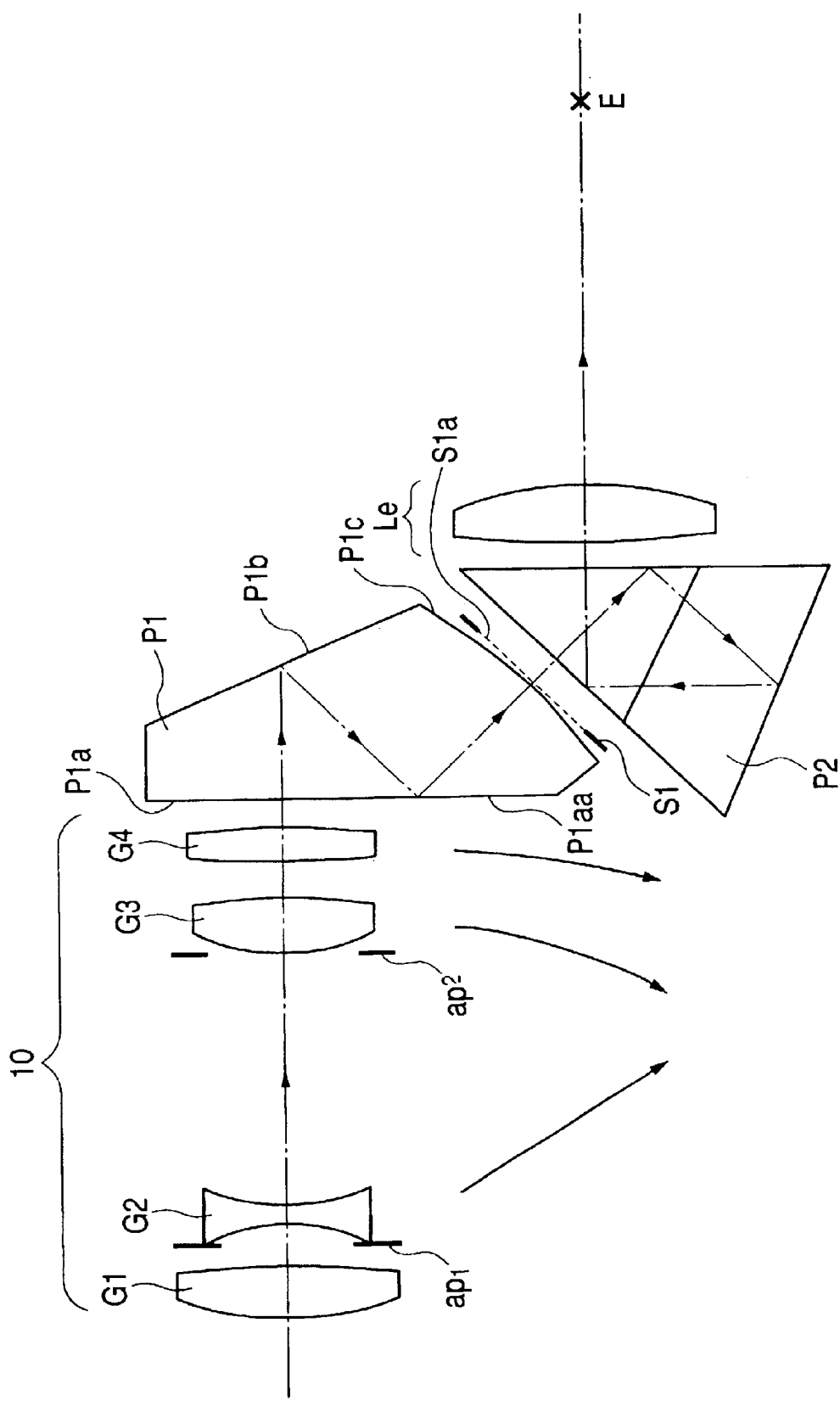
FIG. 1 is a cross-sectional view illustrating a main portion of a finder of a first embodiment according to the present invention.

Embodiments of the present invention will be described hereinafter. A first embodiment will be discussed in the first place. FIG. 1 illustrates a finder of the first embodiment whose optical path is not developed.

In FIG. 1, there is shown an objective optical system 10 having positive power (power is equal to a reciprocal number of a focal length). The optical system 10 is composed of a zoom system, and forms an object image (a finder image) on a predetermined plane. A triangular prism P1 is arranged such that light from the objective optical system 10 enters an incidence plane P1$a$, a first reflective surface P1$b$ reflects the light toward the object side, and a total reflective surface P1$aa$, which is also the incidence plane P1$a$, effectively folds and guides the light to a primary image plane S1$a$. An exit surface P1$c$ of the optical system 10 has an appropriate positive power to create convergent or parallel emerging light rays. The exit surface P1$c$ thus functions as a field lens.

There is also arranged a Dach prism P2 which inverts, with respect to lower and upper sides, and right and left sides, the object image formed on the primary image plane S1$a$ near the exit surface P1$c$ of the triangular prism P1 to convert the object image to an erecting image. An eyepiece optical system Le having positive power is arranged such that the object image formed on the primary image plane S1$a$ by the objective optical system 10 can be observed through the Dach prism P2 as an erecting object image from an eye point E.

A field frame S1 is also disposed on the primary image plane S1$a$ or near the image plane S1$a$ (near the exit surface P1$c$ of the triangular prism P1) to show a range of visual field of the finder. The field frame S1 can be mechanically constructed, or can be composed of a display device such as a liquid crystal.

The objective optical system 10 of the first embodiment includes, in the order from the object side, a first unit (a first lens unit) G1 having positive power, a second unit (a second lens unit) G2 having negative power, a third unit (a third lens unit) G3 having positive power, and a fourth unit (a fourth lens unit) G4 having positive power. When zooming is performed from a wide-angle end to a telephoto end, the second unit G2 is moved toward the image plane side, the third unit G3 is moved toward the object side, and the fourth unit G4 is moved such that an air space between the fourth unit G4 and the third unit G3 is changed.

A first stop ap1 is arranged on the object side of the second unit G2, and moves together with the second unit G2 during the zooming. A second stop ap2 is also arranged on the object side of the third unit G3, and moves together with the third unit G3 during the zooming.

The first embodiment is a real image type zoom finder in which the object image formed by the objective optical system 10 is observed by the eyepiece optical system Le through the image inverting means P1 and P2.

The arrangement of the optical system in the finder illustrated in FIG. 1 only shows an example, and the manner of folding the optical path is not limited to the illustrated manner performed by the triangular prism P1 and the Dach prism P2. Any manner, such as a secondary imaging manner using a relay optical system, and a manner using a Porro prism, can also be applied.

Numerical examples of the first embodiment will be described hereinafter. FIGS. 2, 6, 10, 14, 19, 23 and 27 are lens sectional views of first to seventh numerical examples described later, respectively. In those figures, the optical path is developed, and the triangular prism P1 and the Dach prism P2 illustrated in FIG. 1 are simply illustrated in the form of two prism blocks whose optical paths are developed.

In the lens sectional views, (W), (M) and (T) indicate wide-angle end, intermediate zoom point, and telephoto end, respectively. Arrows indicate moving loci of lens groups during the zooming from the wide-angle end to the telephoto end.

Figure 3:
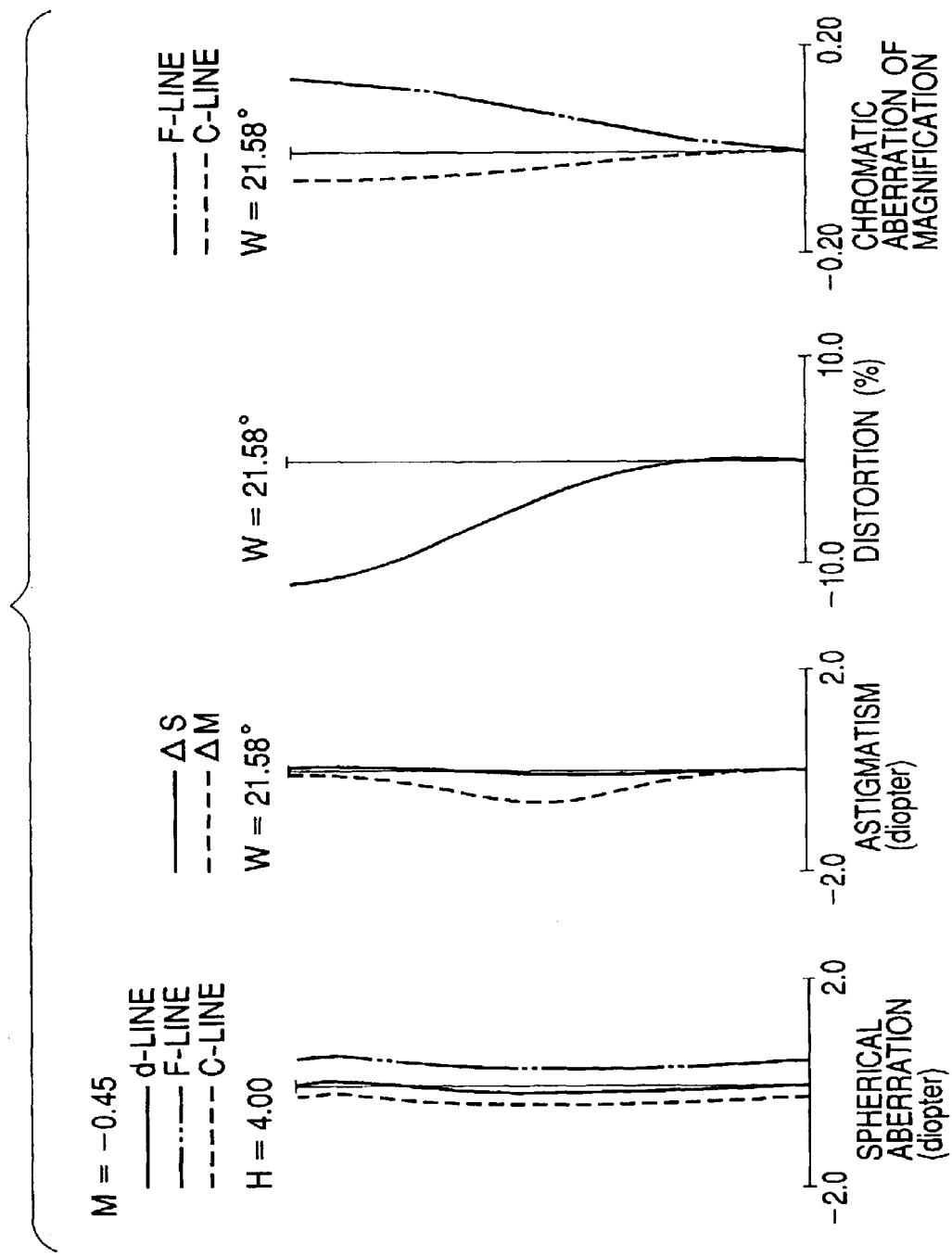
FIG. 3 is a view illustrating aberration charts of the first numerical example at its wide-angle end.
Figure 4:
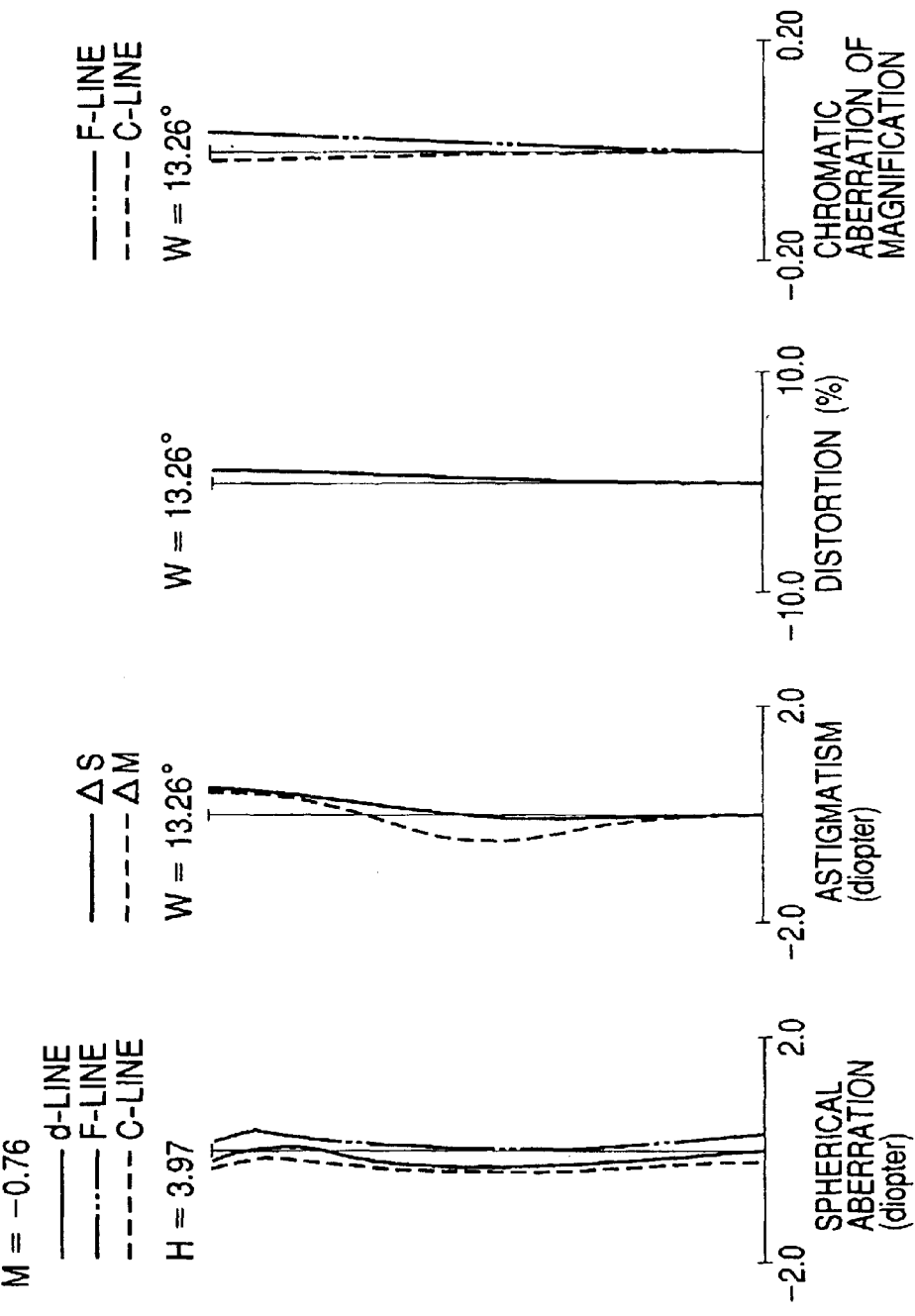
FIG. 4 is a view illustrating aberration charts of the first numerical example at its intermediate zoom point.
Figure 5:
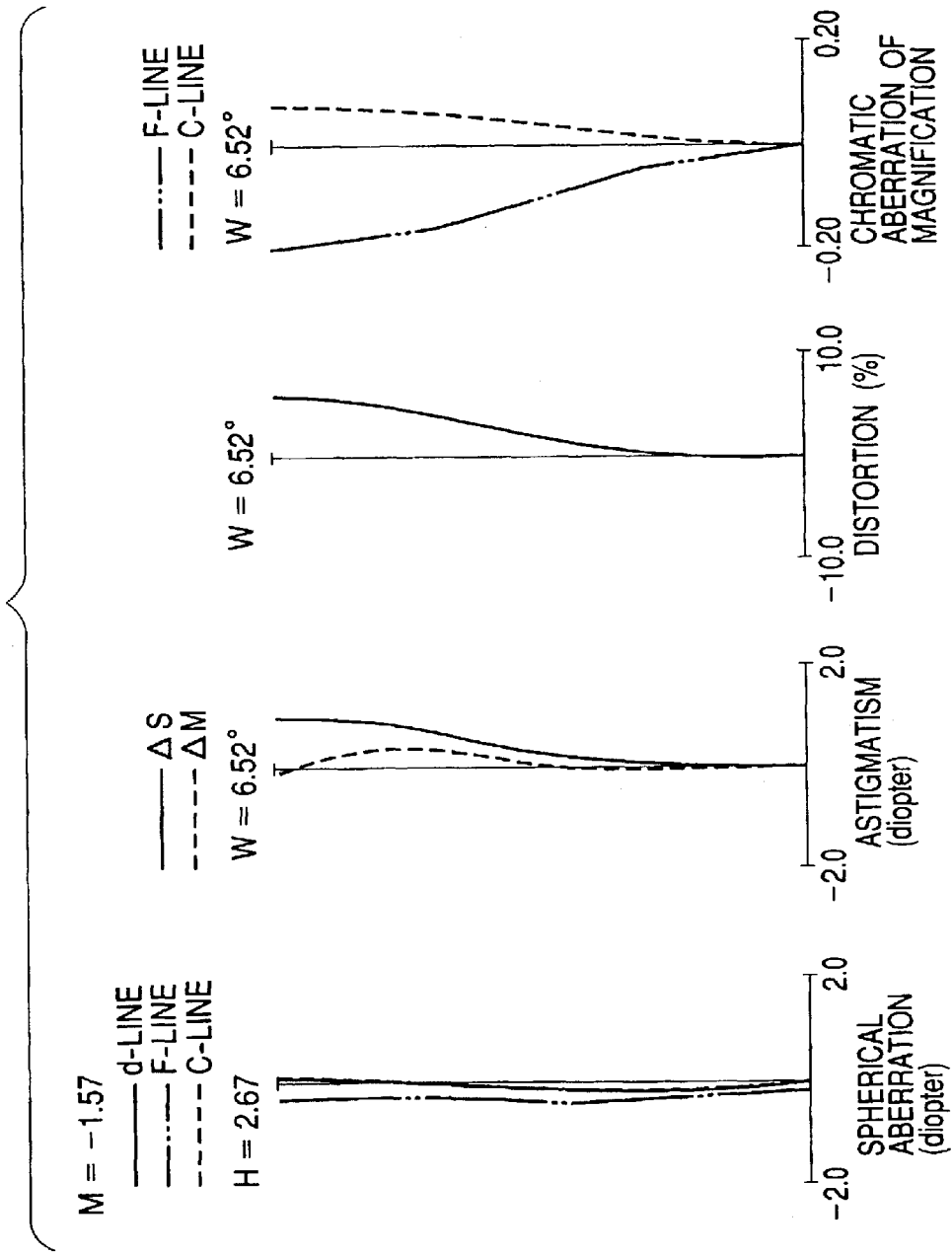
FIG. 5 is a view illustrating aberration charts of the first numerical example at its telephoto end.
Figure 7:
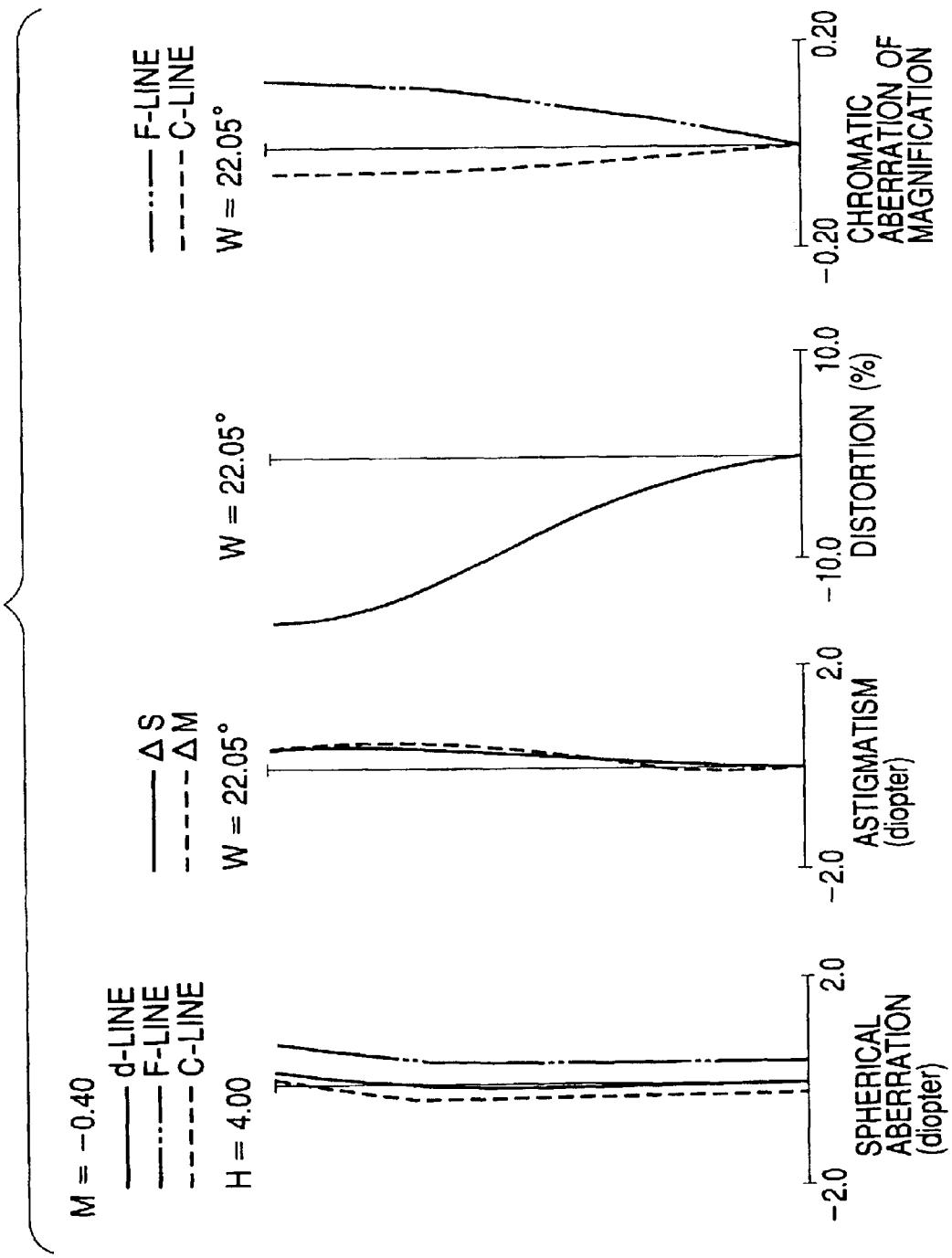
FIG. 7 is a view illustrating aberration charts of the second numerical example at its wide-angle end.
Figure 8:
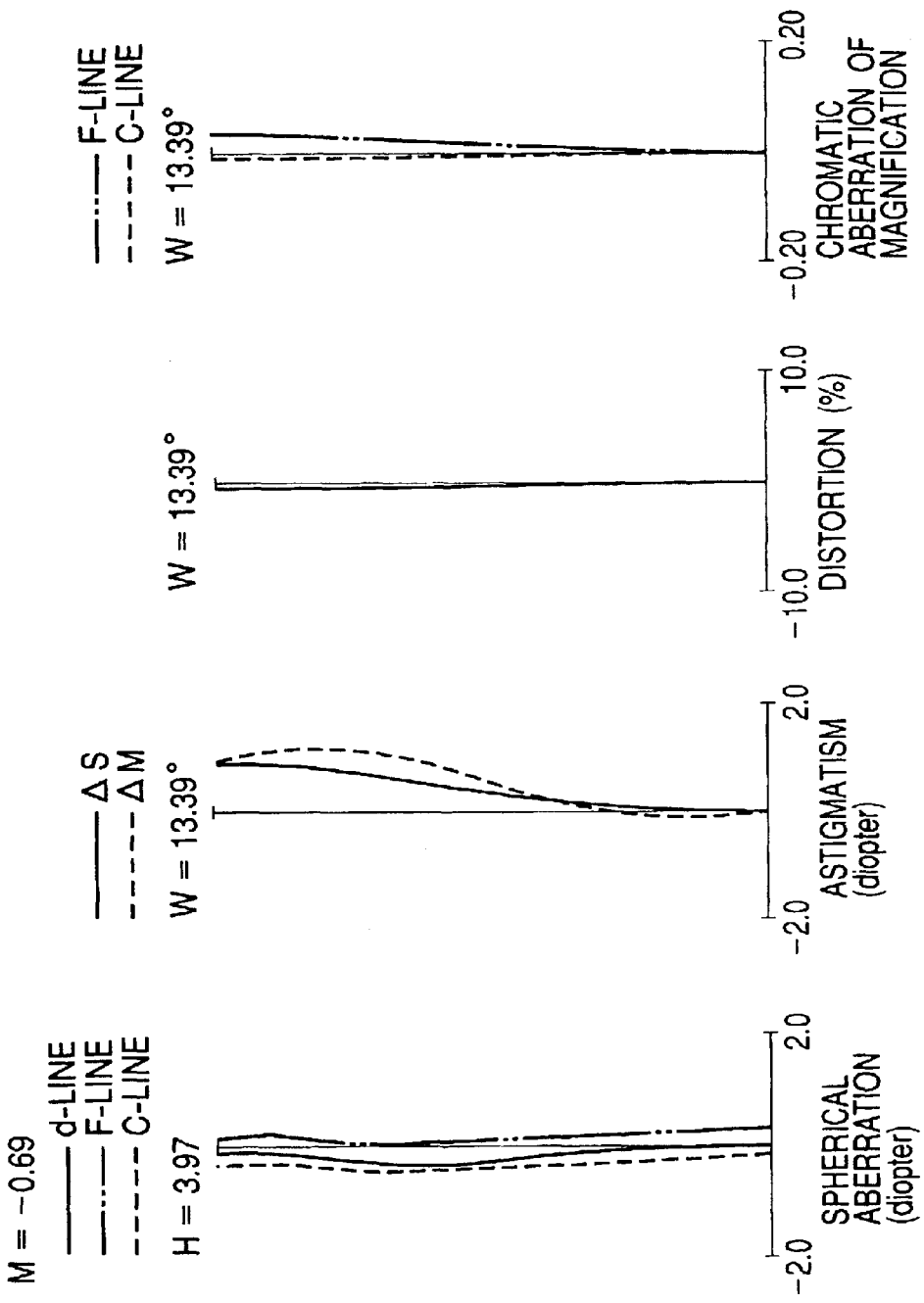
FIG. 8 is a view illustrating aberration charts of the second numerical example at its intermediate zoom point.
Figure 9:
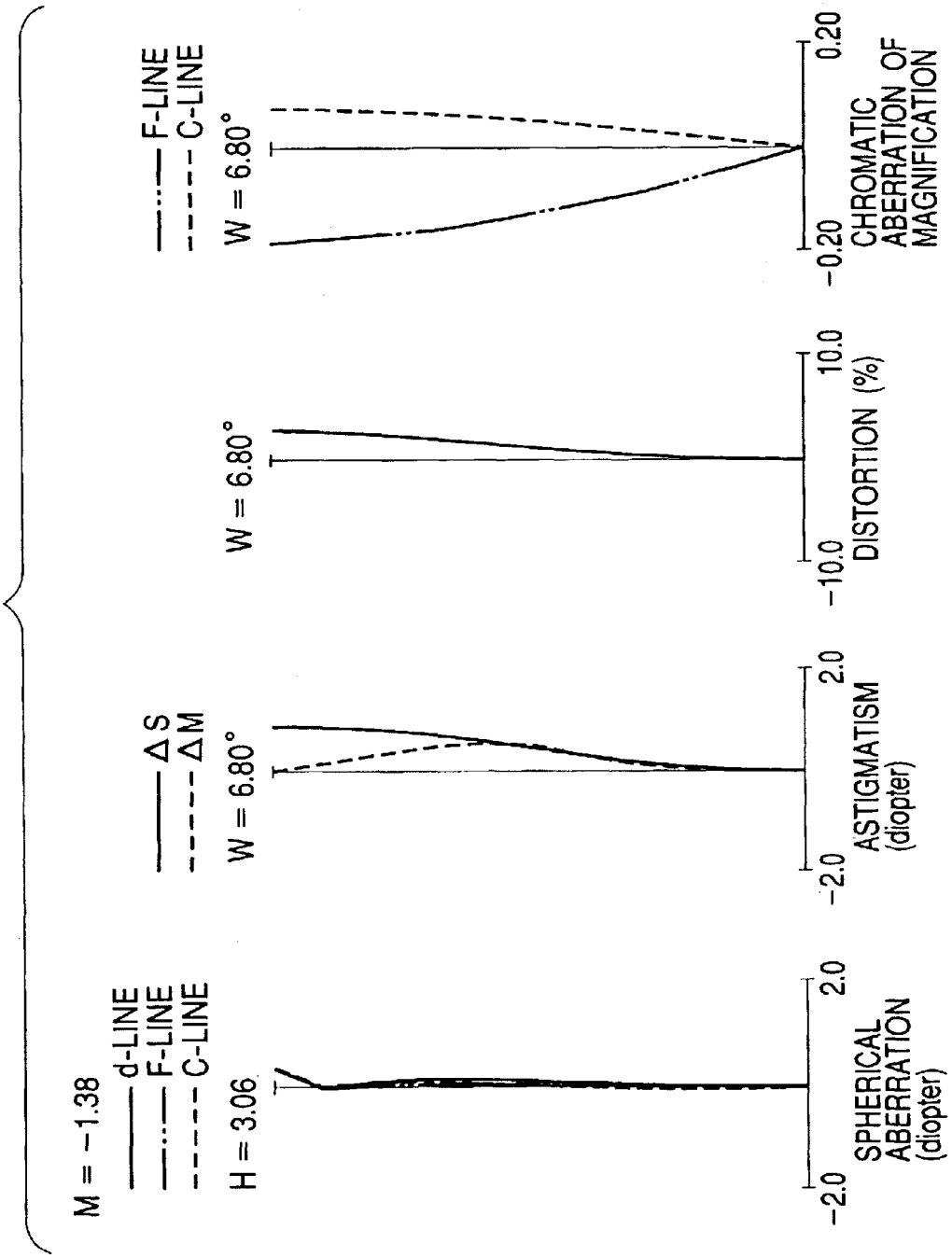
FIG. 9 is a view illustrating aberration charts of the second numerical example at its telephoto end.
Figure 11:
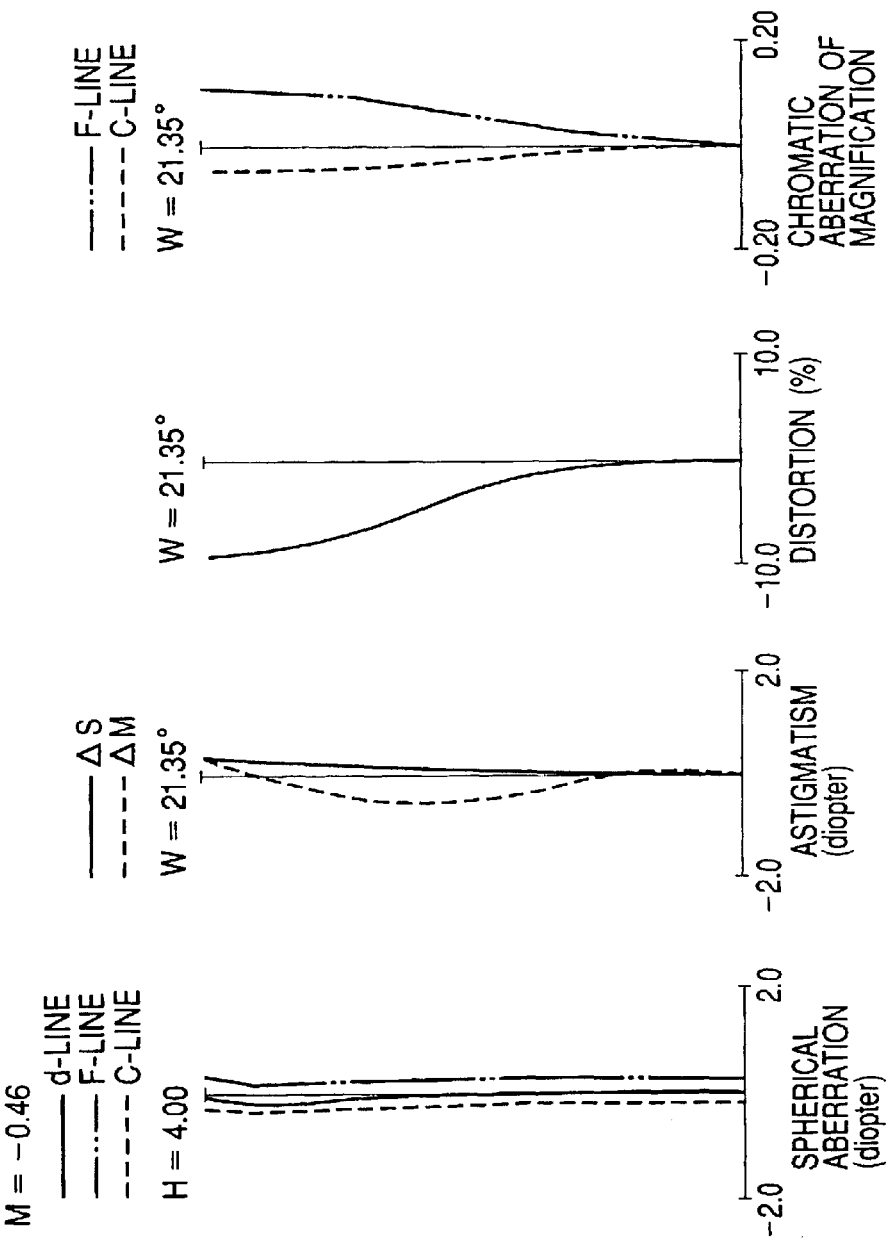
FIG. 11 is a view illustrating aberration charts of the third numerical example at its wide-angle end.
Figure 12:
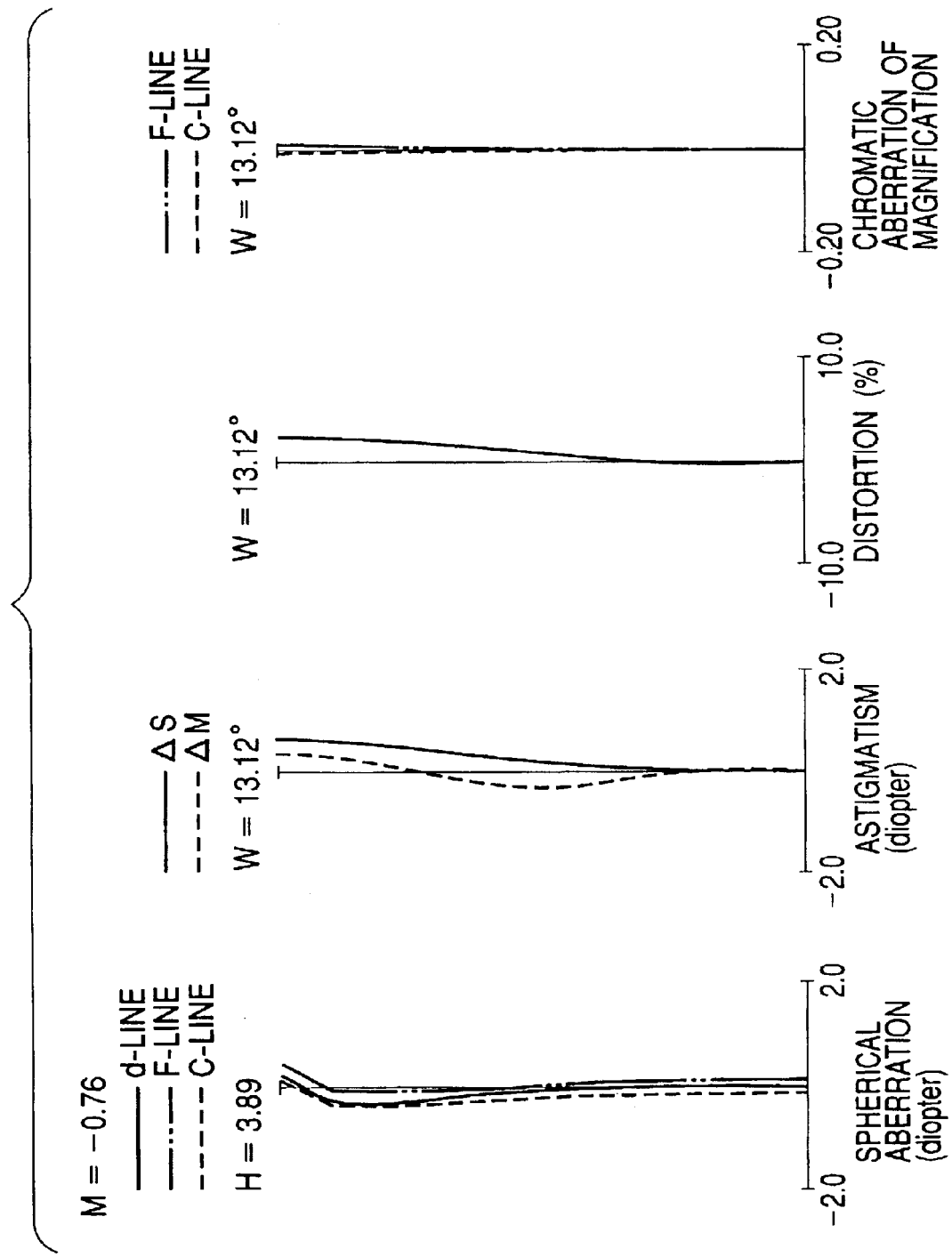
FIG. 12 is a view illustrating aberration charts of the third numerical example at its intermediate zoom point.
Figure 13:
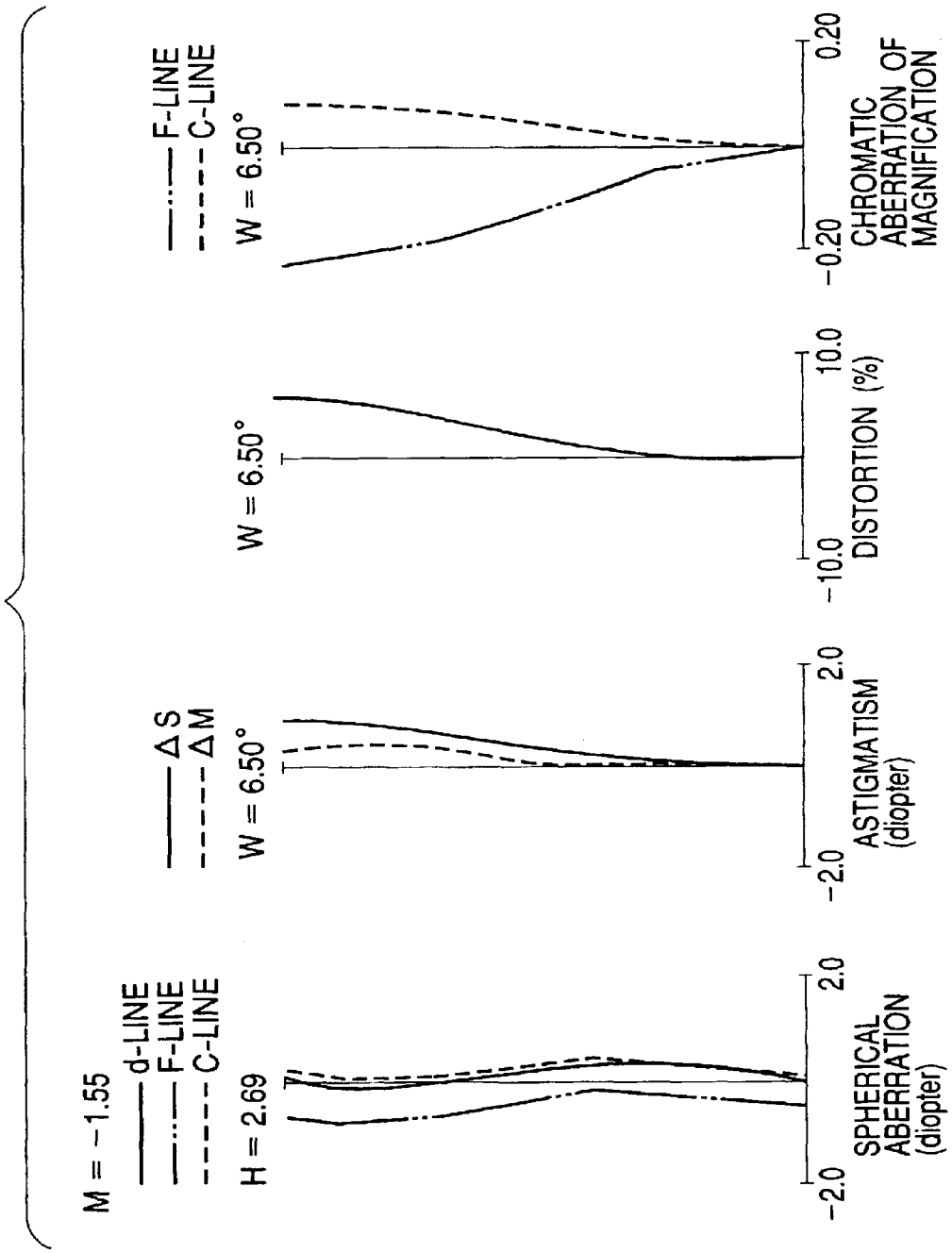
FIG. 13 is a view illustrating aberration charts of the third numerical example at its telephoto end.
Figure 15:
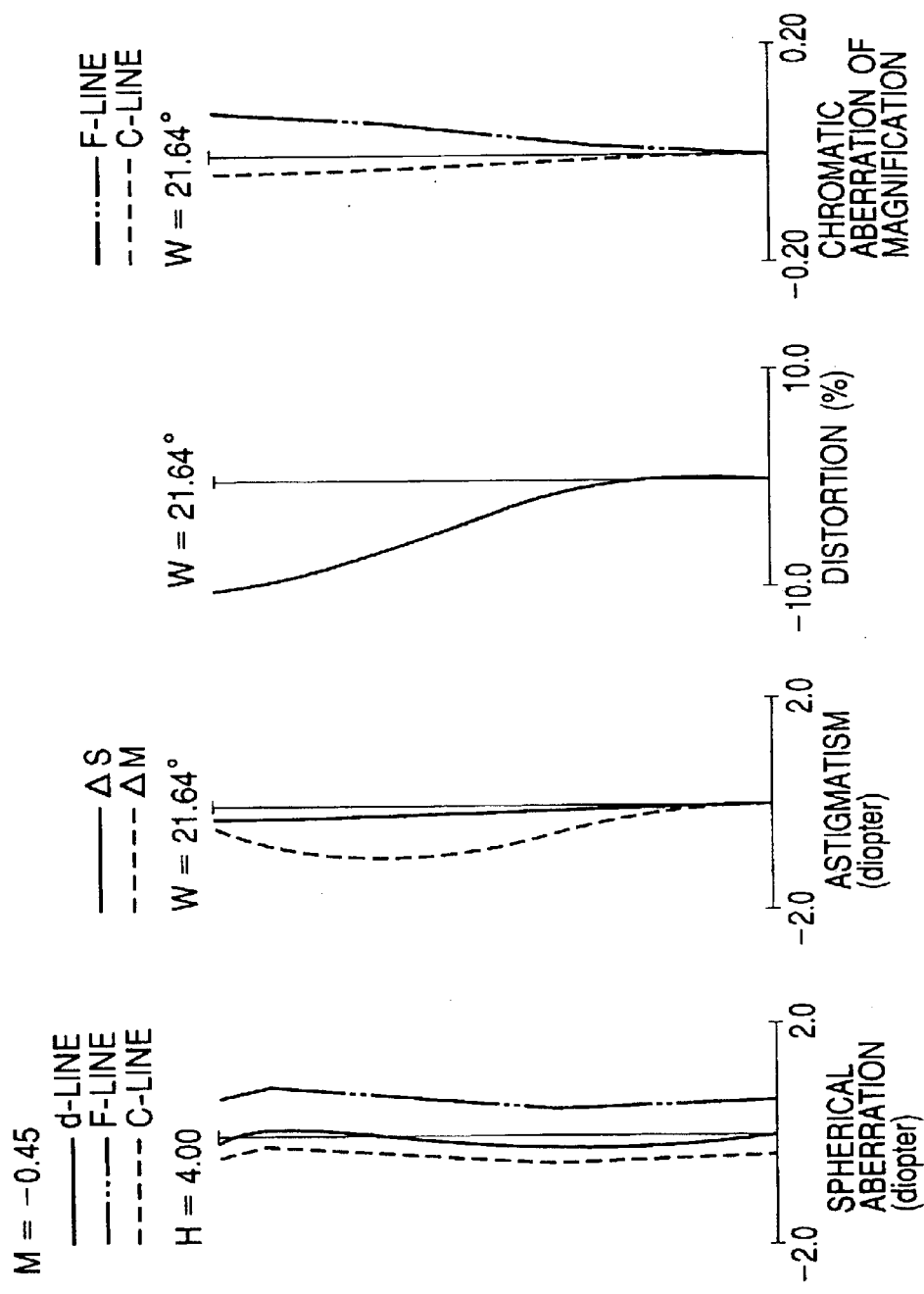
FIG. 15 is a view illustrating aberration charts of the fourth numerical example at its wide-angle end.
Figure 16:
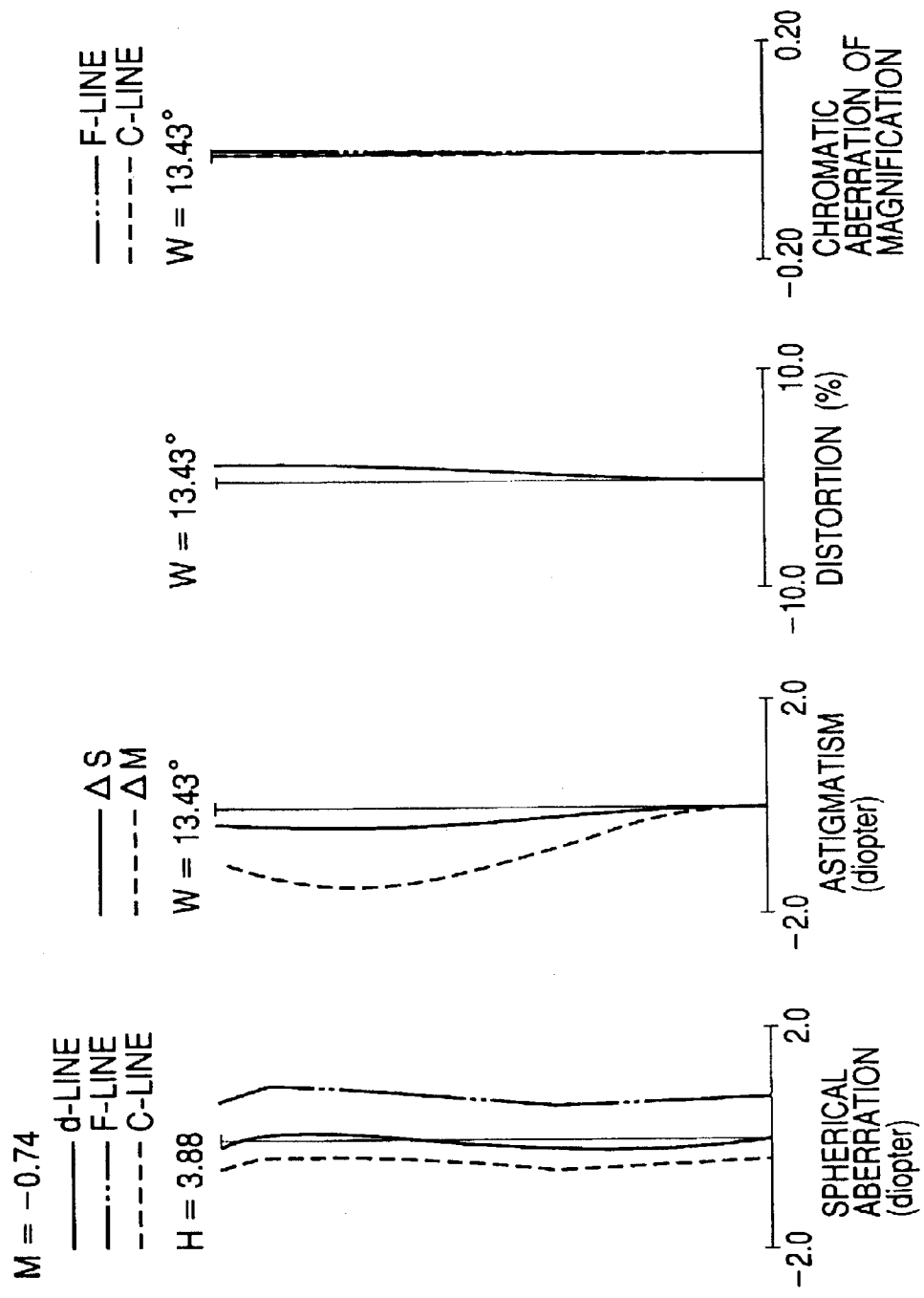
FIG. 16 is a view illustrating aberration charts of the fourth numerical example at its intermediate zoom point.
Figure 17:
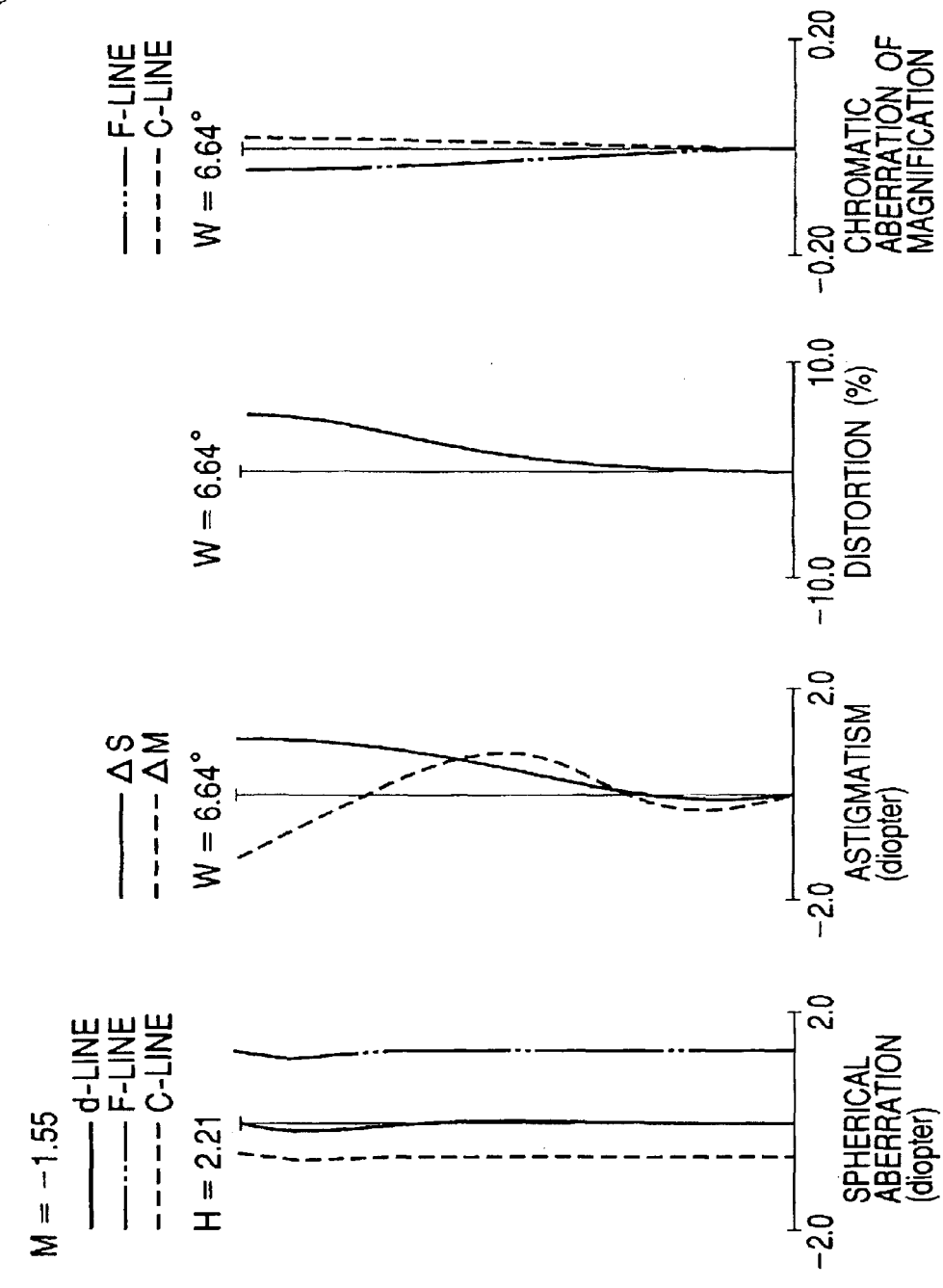
FIG. 17 is a view illustrating aberration charts of the fourth numerical example at its telephoto end.
Figure 20:
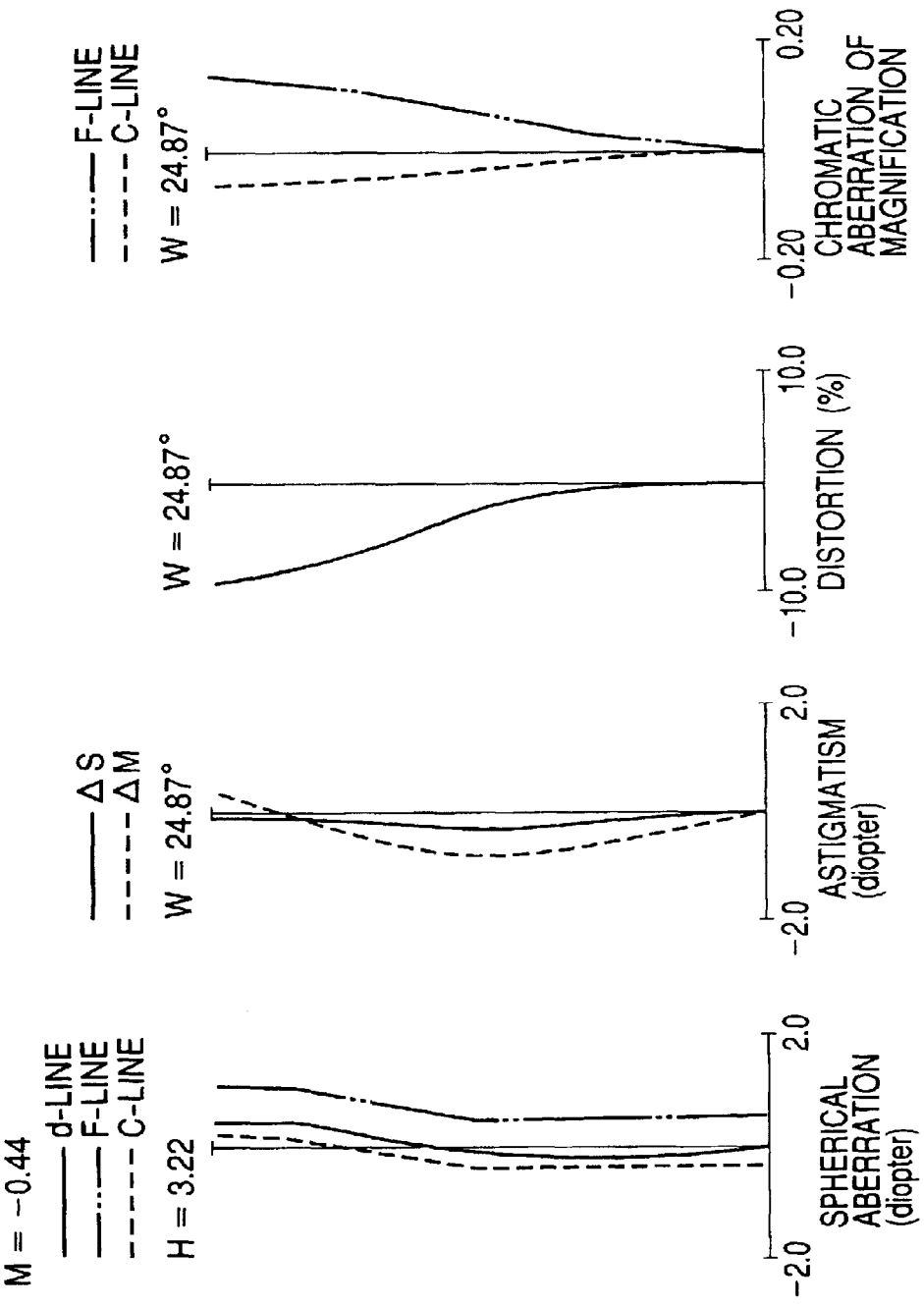
FIG. 20 is a view illustrating aberration charts of the fifth numerical example at its wide-angle end.
Figure 21:
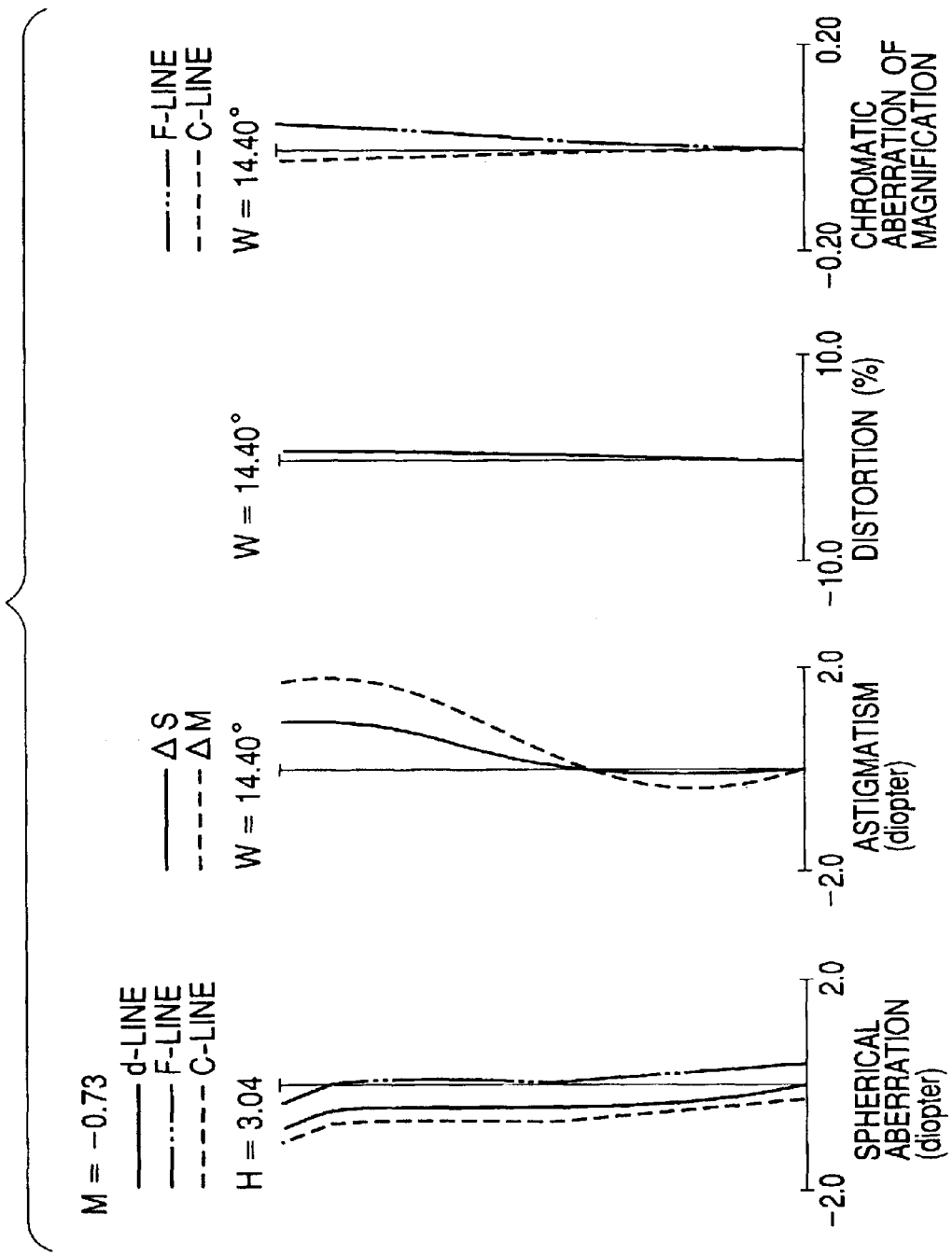
FIG. 21 is a view illustrating aberration charts of the fifth numerical example at its intermediate zoom point.
Figure 22:
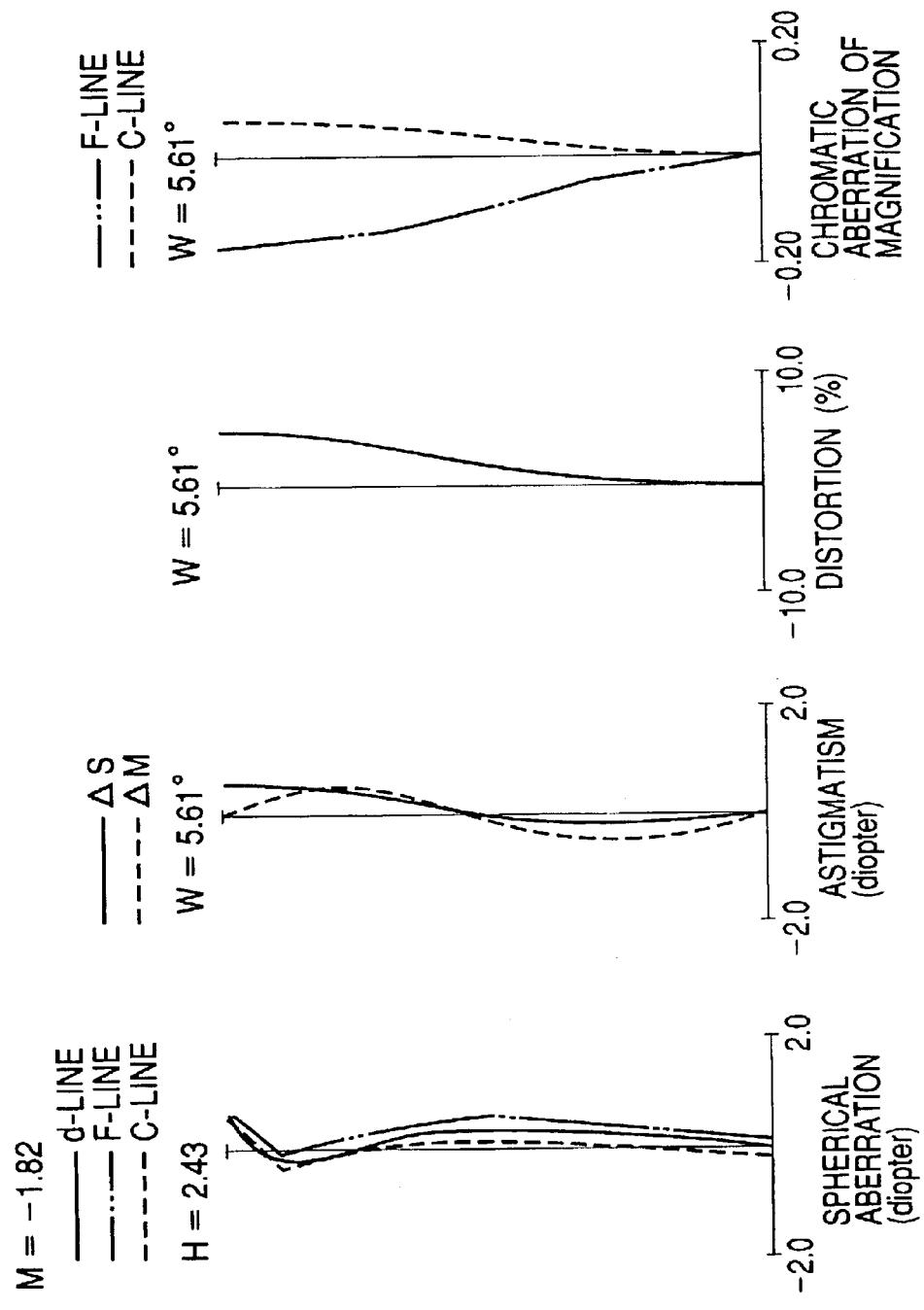
FIG. 22 is a view illustrating aberration charts of the fifth numerical example at its telephoto end.
Figure 24:
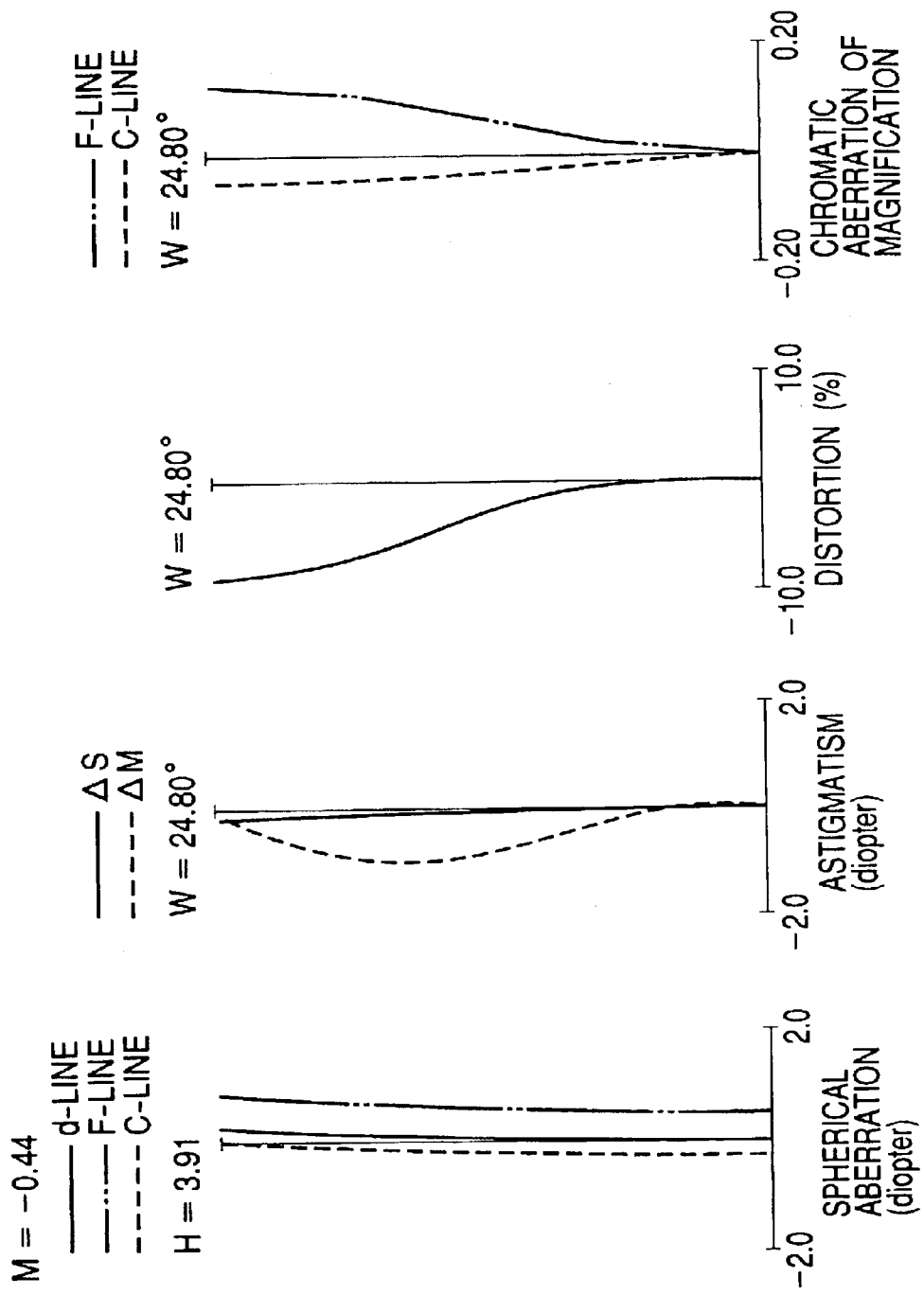
FIG. 24 is a view illustrating aberration charts of the sixth numerical example at its wide-angle end.
Figure 25:
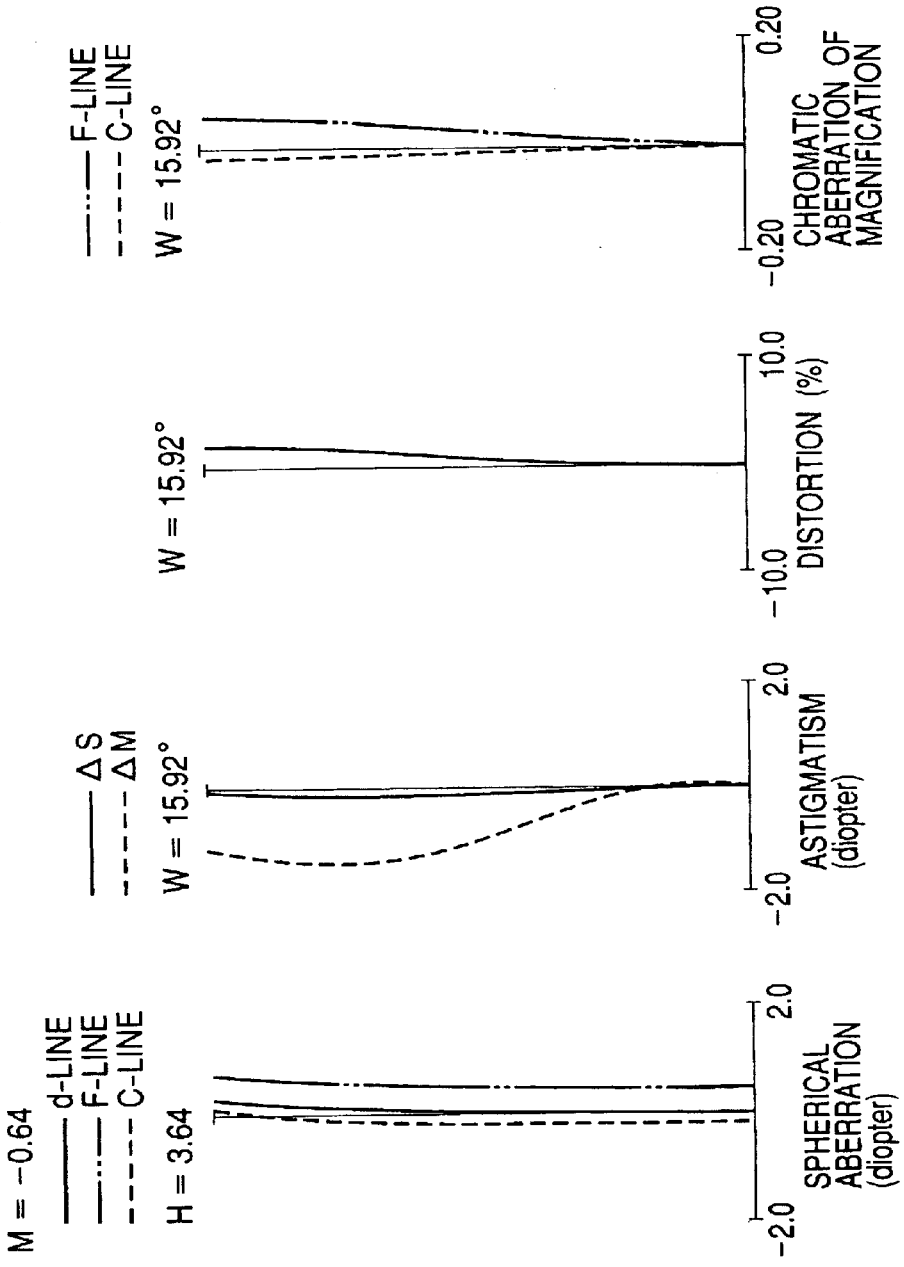
FIG. 25 is a view illustrating aberration charts of the sixth numerical example at its intermediate zoom point.
Figure 26:
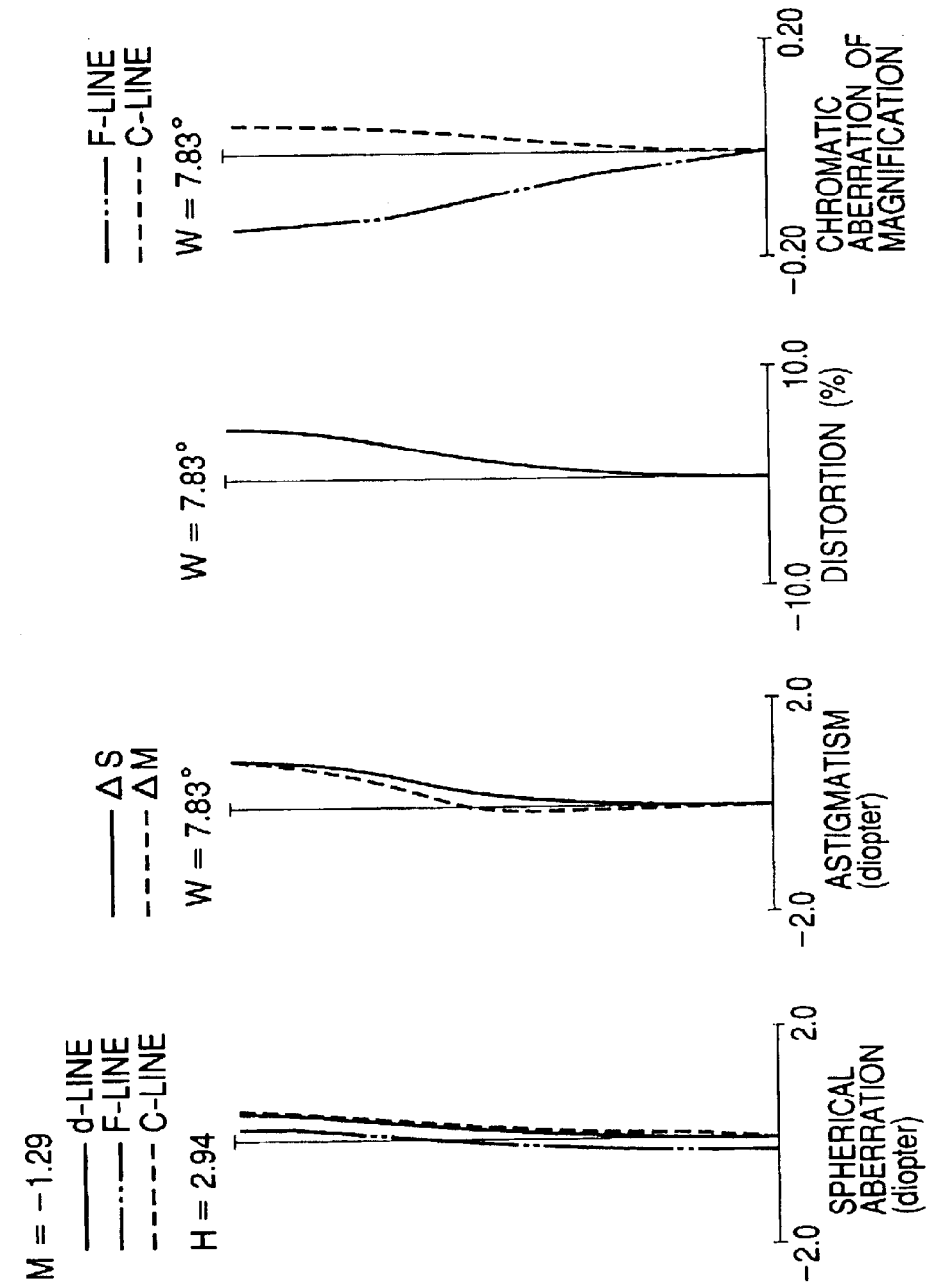
FIG. 26 is a view illustrating aberration charts of the sixth numerical example at its telephoto end.
Figure 28:
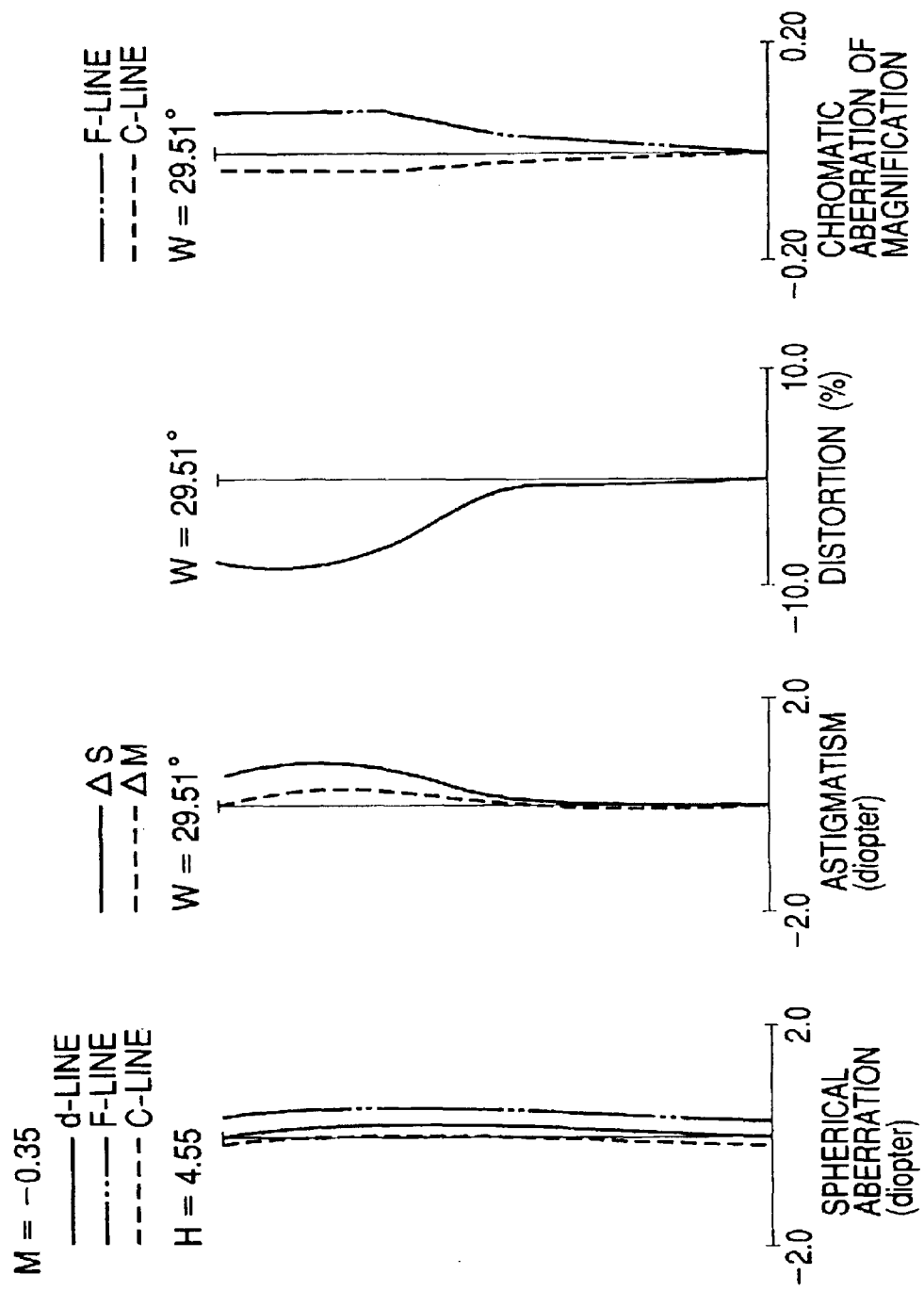
FIG. 28 is a view illustrating aberration charts of the seventh numerical example at its wide-angle end.
Figure 29:
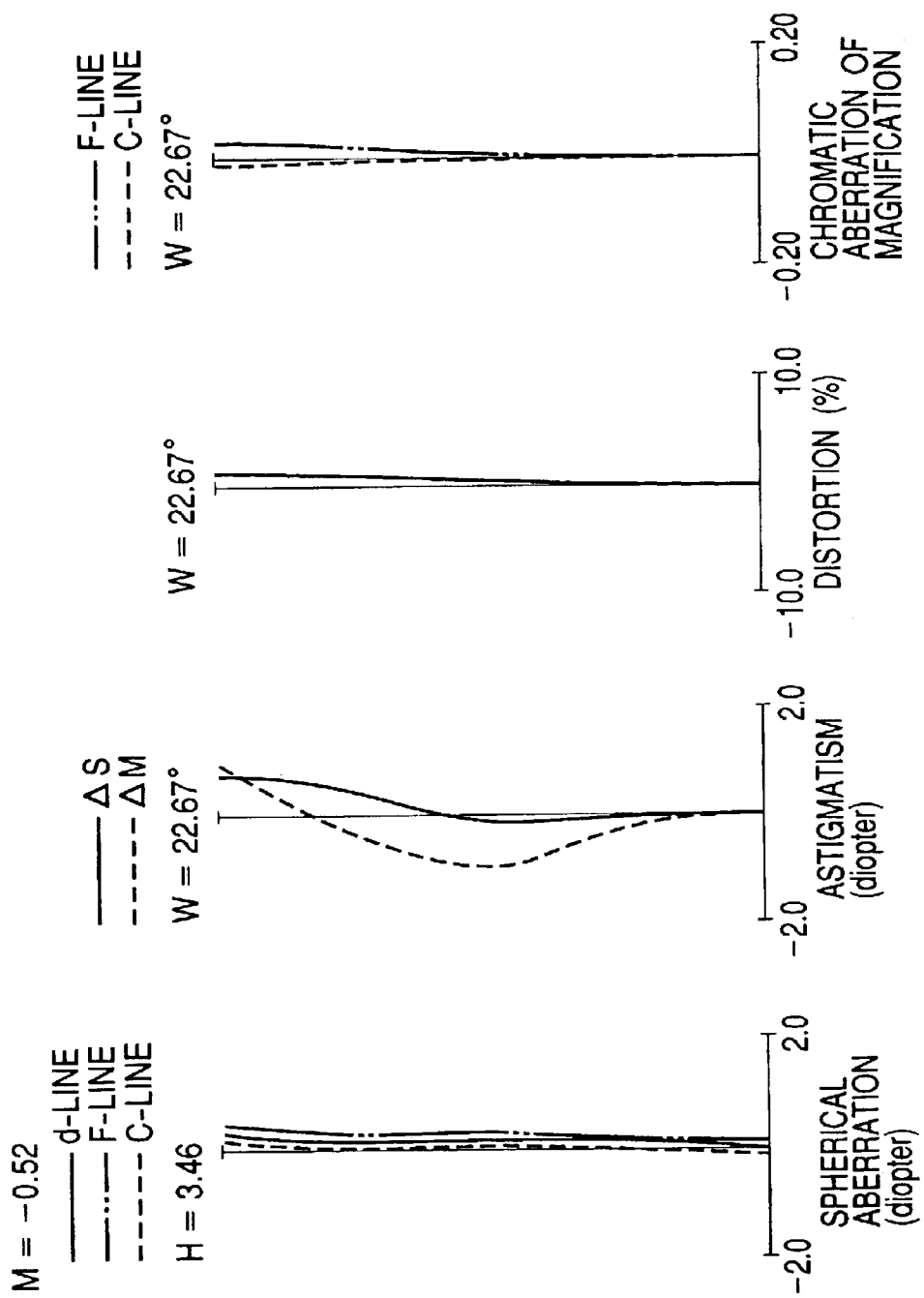
FIG. 29 is a view illustrating aberration charts of the seventh numerical example at its intermediate zoom point.
Figure 30:
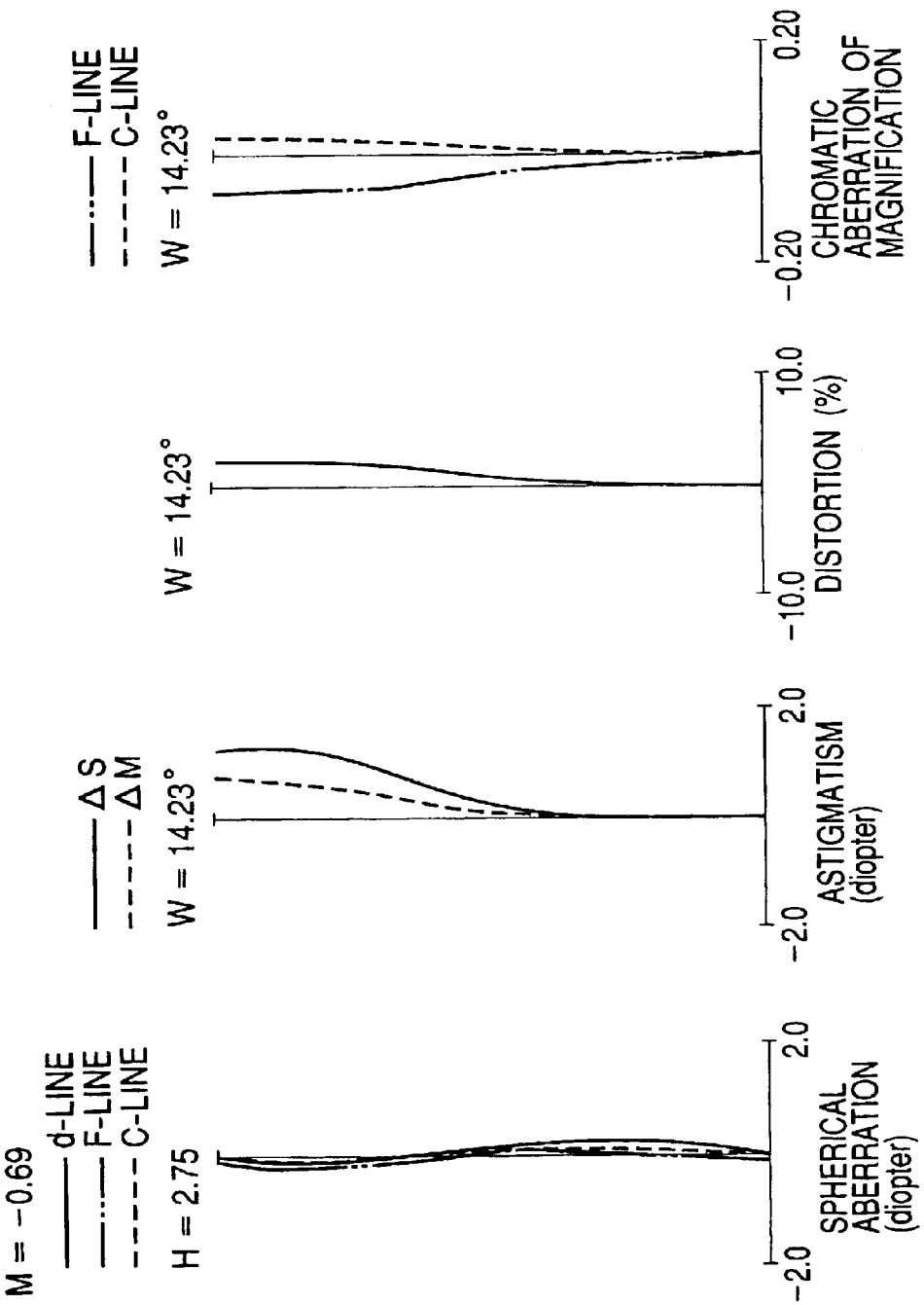
FIG. 30 is a view illustrating aberration charts of the seventh numerical example at its telephoto end.

FIGS. 3, 4 and 5 are aberration charts of the first numerical example at wide-angle end, intermediate zoom point, and telephoto end, respectively. FIGS. 7, 8 and 9 are aberration charts of the second numerical example at wide-angle end, intermediate zoom point, and telephoto end, respectively. FIGS. 11, 12 and 13 are aberration charts of the third numerical example at wide-angle end, intermediate zoom point, and telephoto end, respectively. FIGS. 15, 16 and 17 are aberration charts of the fourth numerical example at wide-angle end, intermediate zoom point, and telephoto end, respectively. FIGS. 20, 21 and 22 are aberration charts of the fifth numerical example at wide-angle end, intermediate zoom point, and telephoto end, respectively. FIGS. 24, 25 and 26 are aberration charts of the sixth numerical example at wide-angle end, intermediate zoom point, and telephoto end, respectively. FIGS. 28, 29 and 30 are aberration charts of the seventh numerical example at wide-angle end, intermediate zoom point, and telephoto end, respectively.

FIRST NUMERICAL EXAMPLE

Figure 2:
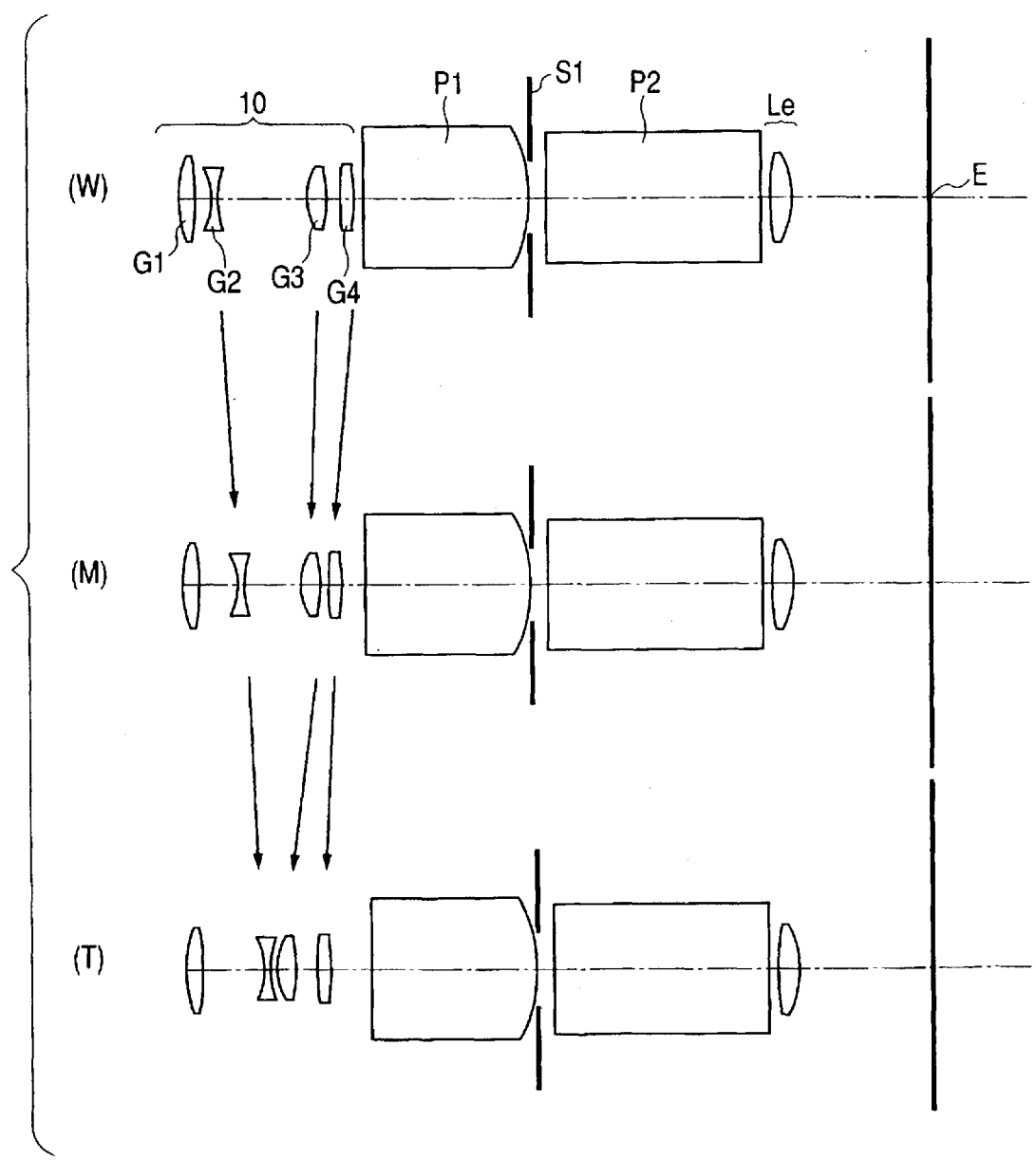
FIG. 2 is a cross-sectional view illustrating a main portion of an optical system of a first numerical example according to the present invention.

In FIG. 2, the objective optical system 10 includes, in the order from the object side, a first unit G1 having positive power, a second unit G2 having negative power, a third unit G3 having positive power, and a fourth unit G4 having positive power. When zooming is performed from the wide-angle end to the telephoto end, the second unit G2 is monotonously moved toward the image plane side, the third unit G3 is moved toward the object side, and the fourth unit G4 is moved such that the air space between the fourth unit G4 and the third unit G3 is changed. The out-of-axis aberrations can be particularly corrected over the entire zoom range between the wide-angle end and the telephoto end due to the movement of the fourth unit G4. Thus, the entire visual field can be made preferable. The first unit G1 remains stationary.

SECOND NUMERICAL EXAMPLE

Figure 6:
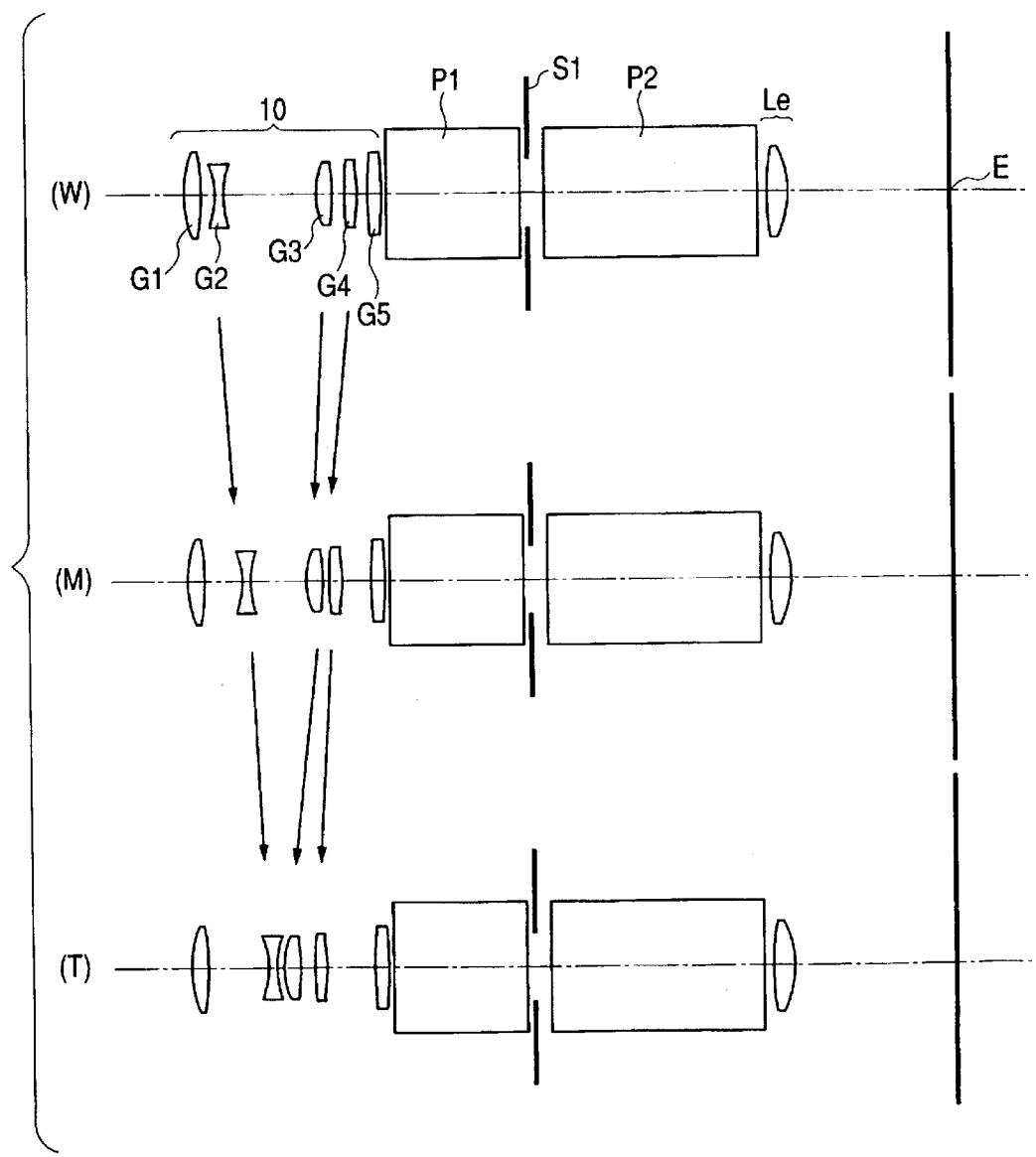
FIG. 6 is a cross-sectional view illustrating a main portion of an optical system of a second numerical example according to the present invention.

In FIG. 6, the objective optical system 10 includes, in the order from the object side, a first unit G1 having positive power, a second unit G2 having negative power, a third unit G3 having positive power, a fourth unit G4 having positive power, and a fifth unit G5 having positive power. When zooming is performed from the wide-angle end to the telephoto end, the second unit G2 is monotonously moved toward the image plane side, the third unit G3 is moved toward the object side, and the fourth unit G4 is moved such that the air space between the fourth unit G4 and the third unit G3 is changed. Since the fifth unit G5 with an appropriate power is arranged, light rays can be made approximately parallel, and the diameter of an entrance pupil in the objective optical system can be reduced. Accordingly, sensitivities of the first to fourth units can be decreased while the spherical aberration appearing in the third unit G3 is suppressed. The first unit G1 and the fifth unit G5 remain stationary.

THIRD NUMERICAL EXAMPLE

Figure 10:
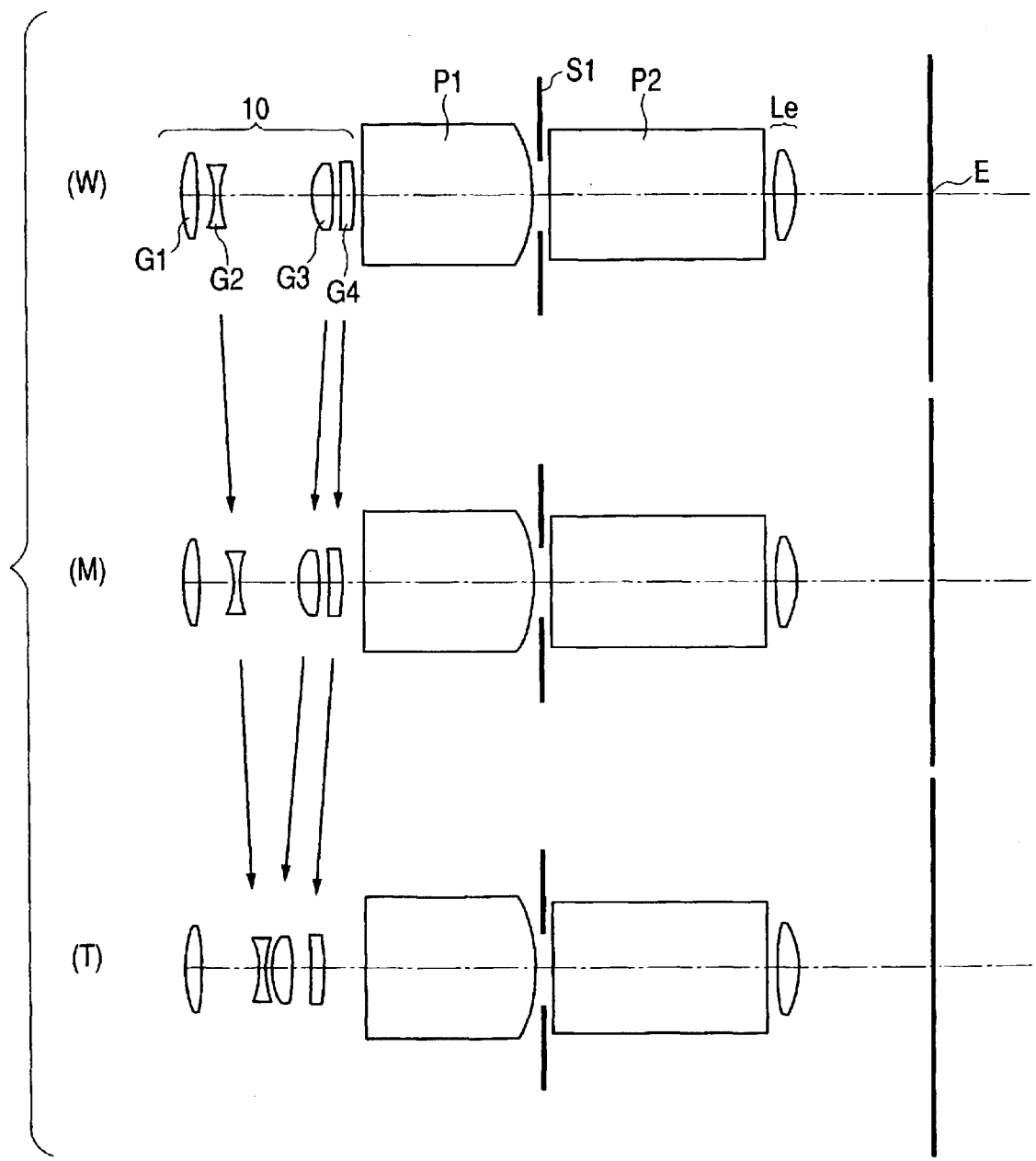
FIG. 10 is a cross-sectional view illustrating a main portion of an optical system of a third numerical example according to the present invention.

In FIG. 10, the objective optical system 10 includes, in the order from the object side, a first unit G1 having positive power, a second unit G2 having negative power, a third unit G3 having positive power, and a fourth unit G4 having positive power. When zooming is performed from the wide-angle end to the telephoto end, the second unit G2 is monotonously moved toward the image plane side, the third unit G3 is moved toward the object side, and the fourth unit G4 is moved such that the air space between the fourth unit G4 and the third unit G3 is changed. In the third numerical example, the third unit G3 consists of a single lens formed of a low-dispersion (vd>60 where vd is the Abbe number) glass material. Accordingly, variation of the chromatic aberration of magnification between the wide-angle end and the telephoto end can be reduced. The first unit G1 remains stationary.

FOURTH NUMERICAL EXAMPLE

Figure 14:
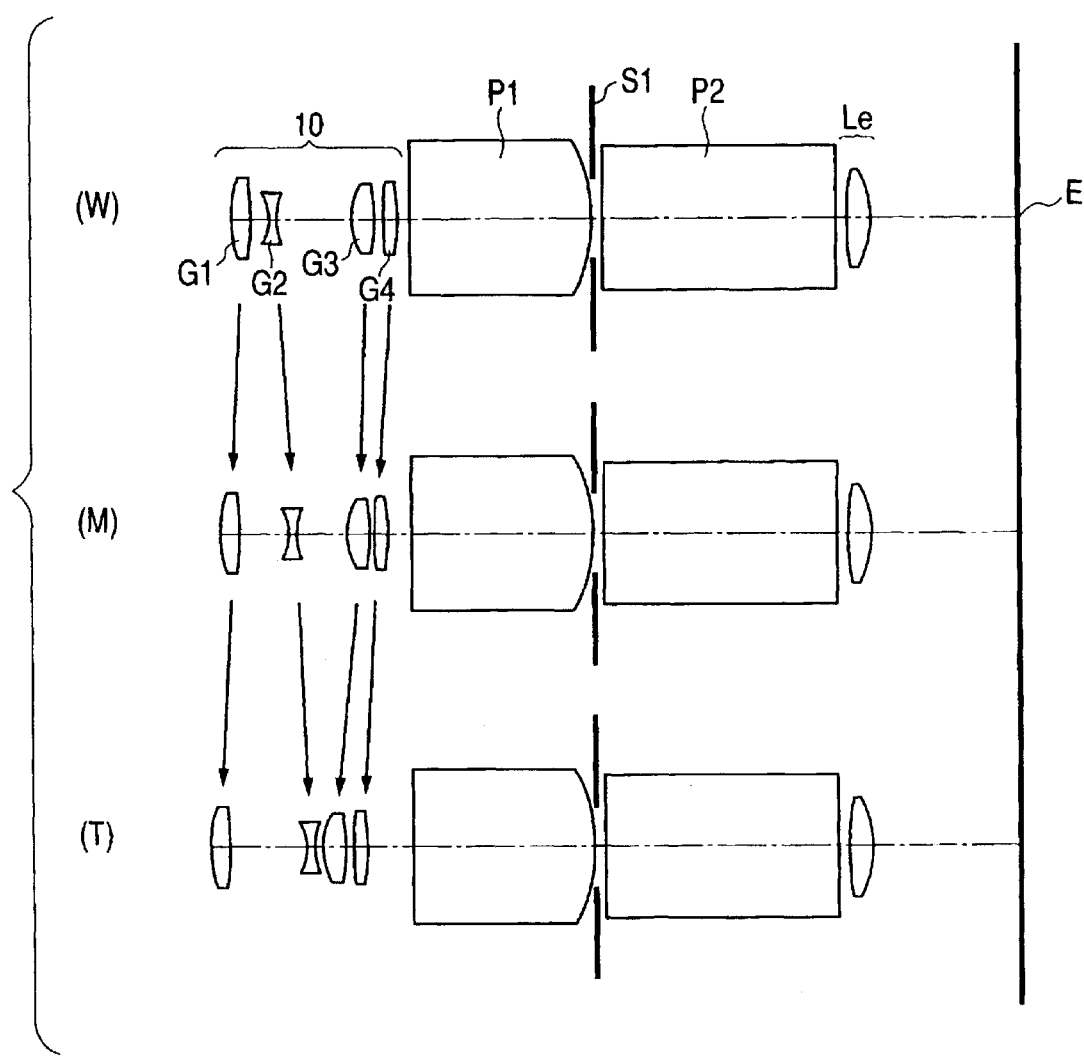
FIG. 14 is a cross-sectional view illustrating a main portion of an optical system of a fourth numerical example according to the present invention.

In FIG. 14, the objective optical system 10 includes, in the order from the object side, a first unit G1 having positive power, a second unit G2 having negative power, a third unit G3 having positive power, and a fourth unit G4 having positive power. When zooming is performed from the wide-angle end to the telephoto end, the first unit G1 is moved toward the object side, the second unit G2 is monotonously moved toward the image plane side, the third unit G3 is moved toward the object side, and the fourth unit G4 is moved such that the air space between the fourth unit G4 and the third unit G3 is changed. In the fourth numerical example, the total length of the objective optical system at the wide-angle end can be further reduced while the out-of-axis aberration is corrected, due to the movement of the first unit G1. Accordingly, the incidence height of out-of-axis rays can be lowered, and the diameter of a front lens can be decreased.

FIFTH NUMERICAL EXAMPLE

Figure 19:
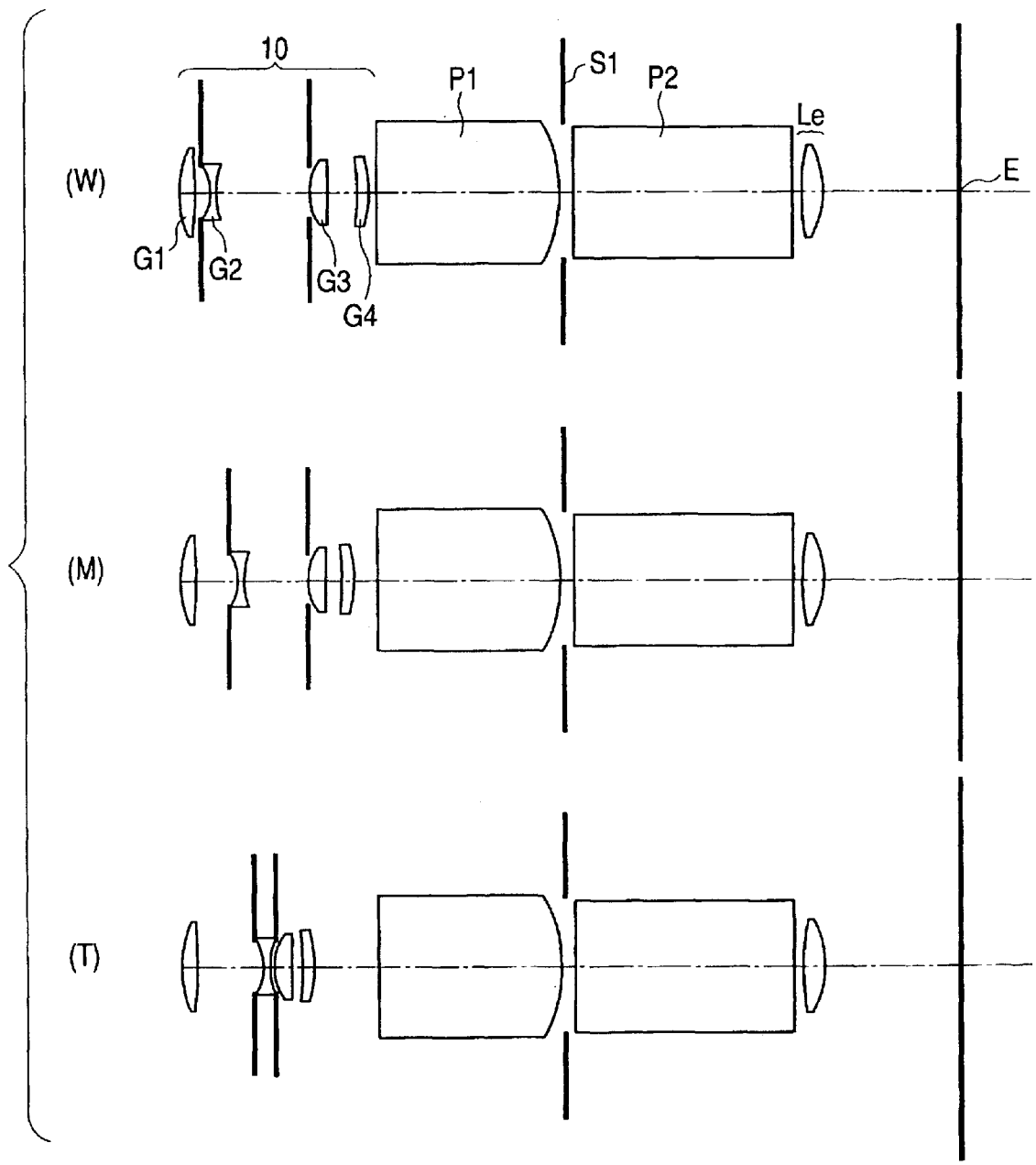
FIG. 19 is a cross-sectional view illustrating a main portion of an optical system of a fifth numerical example according to the present invention.

In FIG. 19, the objective optical system 10 includes, in the order from the object side, a first unit G1 having positive power, a second unit G2 having negative power, a third unit G3 having positive power, and a fourth unit G4 having positive power. When zooming is performed from the wide-angle end to the telephoto end, the second unit G2 is monotonously moved toward the image plane side, the third unit G3 is moved toward the object side, and the fourth unit G4 is moved such that the air space between the fourth unit G4 and the third unit G3 is changed. In the fifth numerical example, the fourth unit G4 is moved while the power of the third unit G3 is appropriately strengthened, so that the amount of movement of the second unit G2 is lowered. Further, there can be achieved a compact finder optical system in which a high zoom ratio of $2\omega=49.8°-11.2°$ is attained. Furthermore, Abbe numbers vd of the lenses of positive power in the objective optical system, i.e., first, third and fourth units G1, G3 and G4, are all set vd<56.5, so that the chromatic aberration of magnification at the telephoto end, which will be the problem when the zoom ratio is enhanced, can be reduced. A preferable visual field is hence achieved. The first unit G1 remains stationary.

SIXTH NUMERICAL EXAMPLE

Figure 23:
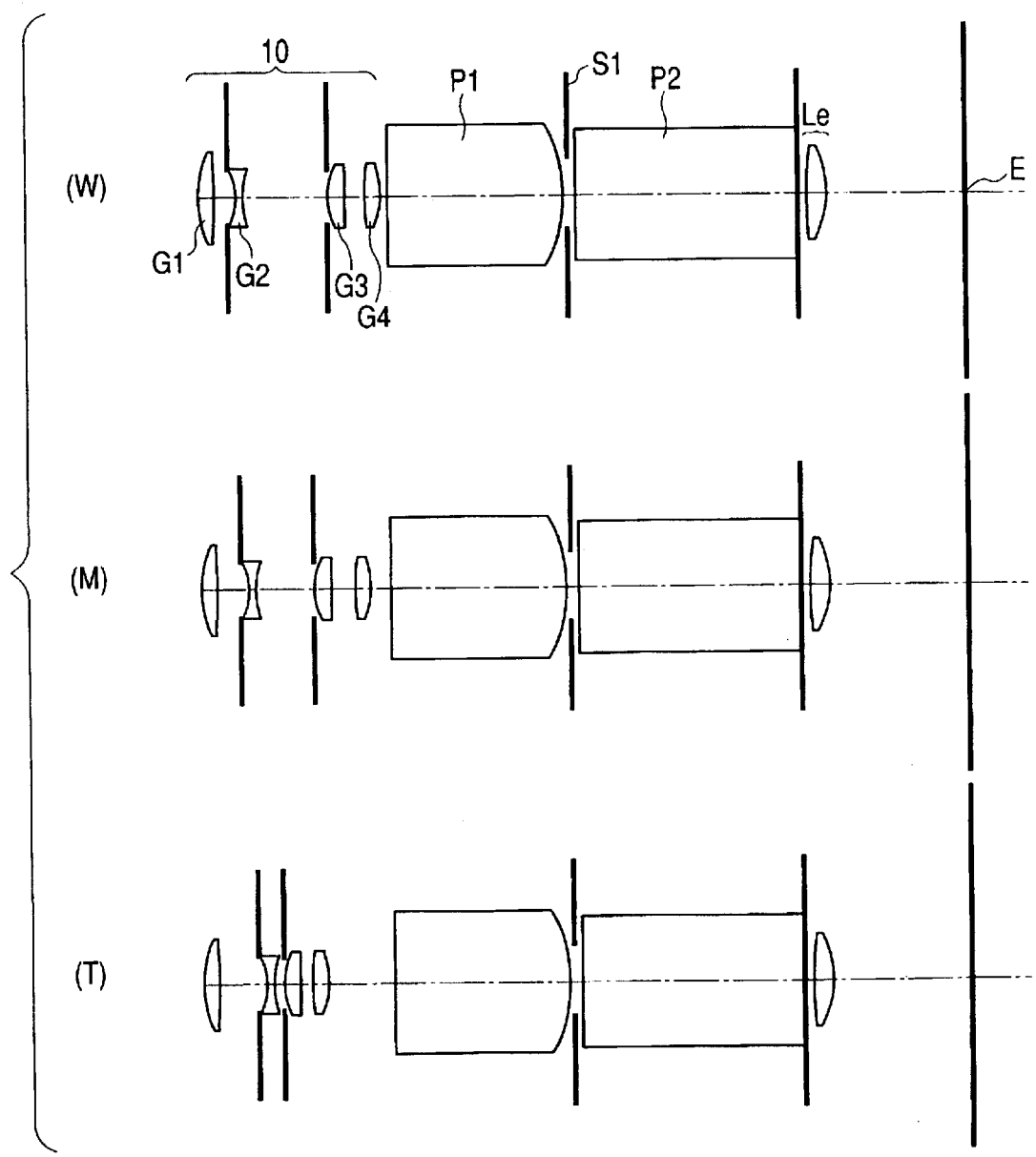
FIG. 23 is a cross-sectional view illustrating a main portion of an optical system of a sixth numerical example according to the present invention.

In FIG. 23, the objective optical system 10 includes, in the order from the object side, a first unit G1 having positive power, a second unit G2 having negative power, a third unit G3 having positive power, and a fourth unit G4 having positive power. When zooming is performed from the wide-angle end to the telephoto end, the second unit G2 is monotonously moved toward the image plane side, the third unit G3 is moved toward the object side, and the fourth unit G4 is moved such that the air space between the fourth unit G4 and the third unit G3 is changed. An appropriate aspherical surface is set only on one surface of each unit such that the aberration correction can be preferably attained while a single lens can be readily made. Thus, a preferable finder image can be observed. The first unit G1 remains stationary.

SEVENTH NUMERICAL EXAMPLE

Figure 27:
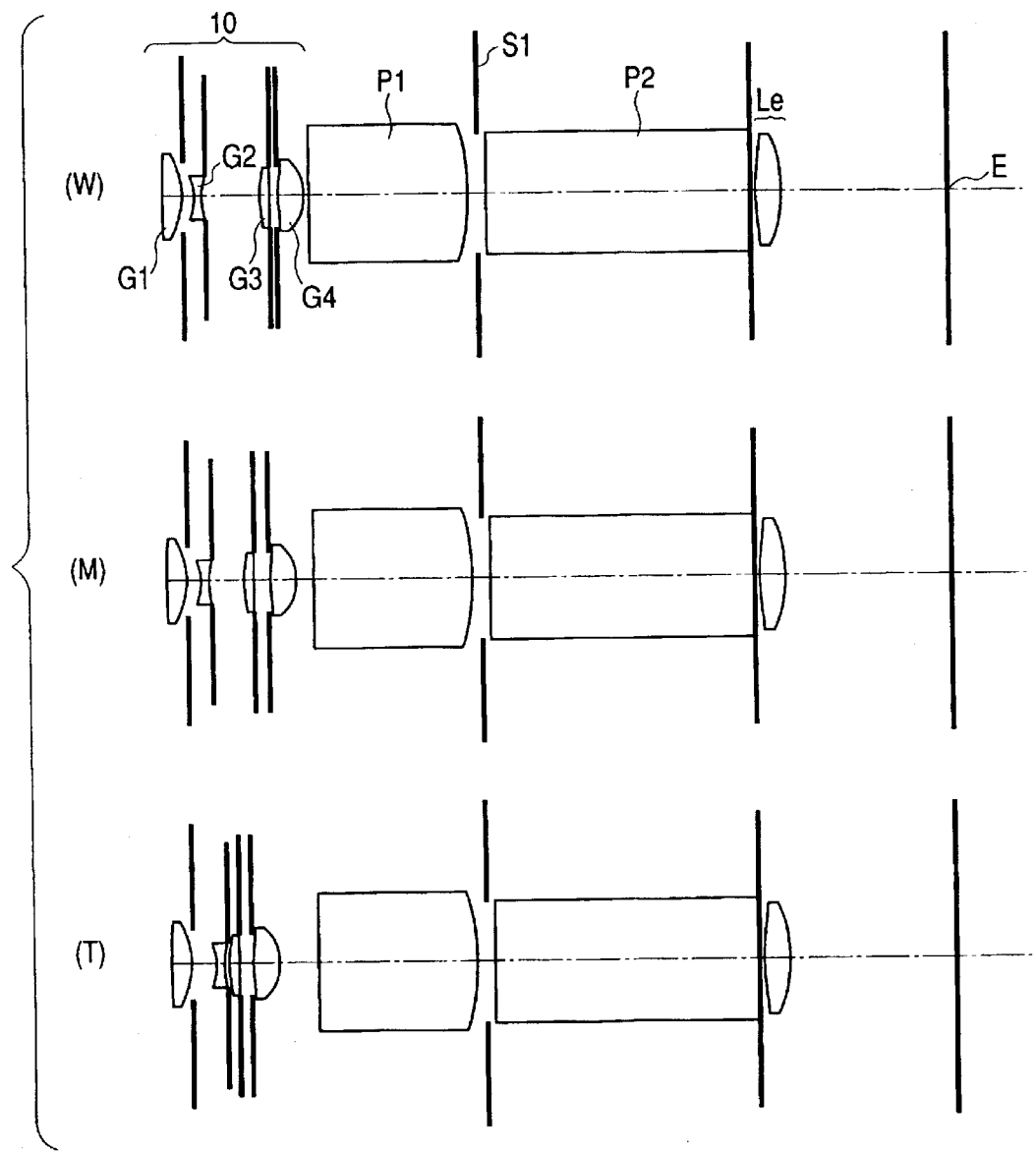
FIG. 27 is a cross-sectional view illustrating a main portion of an optical system of a seventh numerical example according to the present invention.

In FIG. 27, the objective optical system 10 includes, in the order from the object side, a first unit G1 having positive power, a second unit G2 having negative power, a third unit G3 having positive power, and a fourth unit G4 having positive power. When zooming is performed from the wide-angle end to the telephoto end, the second unit G2 is monotonously moved toward the image plane side, the third unit G3 is moved toward the object side, and the fourth unit G4 is moved such that the air space between the fourth unit G4 and the third unit G3 is changed. The power of the fourth unit G4 is appropriately strengthened such that the amount of movement of the second unit G2 is decreased. Further, correction of aberrations and compact structure are achieved due to a change in the space between the fourth unit G4 and the third unit G3. The first unit G1 remains stationary.

In the finder of this embodiment, the moving loci of the third unit G3 and the fourth unit G4 during the zooming can be set such that the space between those units G3 and G4 is not monotonously changed.

The finder of this embodiment satisfies conditions (1) and (2), $$1.0 < f1/Fow < 3.0 \tag{1}$$

$$0.8 < f3/Fow \tag{2}$$

where f1 is the focal length of the first lens unit, f3 is the focal length of the third lens unit, and Fow is the focal length of the objective optical system at the wide-angle end.

Condition (1) is relevant to a ratio between the focal length of the objective optical system at the wide-angle end and the focal length of the first unit, and condition (2) is relevant to a ratio between the focal length of the objective optical system at the wide-angle end and the focal length of the third unit. Those conditions are established to appropriately set the power of each unit such that variation of aberrations can be suppressed while the size of the entire lens system is decreased.

If the power of the first unit goes beyond the lower limit of condition (1) and becomes too strong, correction of the out-of-axis aberration at the wide-angle end, correction of the spherical aberration at the telephoto end, and the like are difficult to achieve. Further, a predetermined zoom ratio cannot be obtained. If the power of the first unit goes beyond the upper limit of condition (1) and becomes too weak, the total length of the lens at the telephoto end tends to increase. It is not preferable.

More preferably, condition (1) is as follows:

$$1.5 < f1/Fow < 2.5 \tag{1a}$$

If the power of the third unit goes beyond the lower limit of condition (2) and becomes too strong, correction of the spherical aberration at the wide-angle end is difficult to achieve. Further, the power of the fourth unit becomes too weak, and variation of aberrations becomes difficult to suppress. More preferably, condition (2) is as follows:

$$1.0 < f3/Fow \tag{2a}$$

The finder of this embodiment further satisfies conditions (3) and (4), $$0.3 < Z2/Z < 0.9 \tag{3}$$

$$0.05 < |Z4|/Z < 2.25 \tag{4}$$

where Z is the zoom ratio of the objective optical system, Z2 is the zoom ratio of the second unit, and Z4 is the zoom ratio of the fourth unit. The zoom ratios of the objective optical system, the second unit, and the fourth unit mean ratios of image-forming magnification occurring during the zooming from the wide-angle end to the telephoto end.

Conditions (3) and (4) are relevant to zoom sharing between the second unit and the fourth unit, and mainly contribute to a reduction in size of the entire lens system and an increase in the zoom ratio. Generally, in an objective optical system constituting a zoom finder, two units, i.e., a zoom unit and a lens unit for correcting the diopter accompanying the movement of the zoom unit, move during zooming. The lens unit for correcting the diopter does not share the zoom ratio. Therefore, when the zoom ratio is increased, the amount of movement of the zoom unit is likely to increase. Further, there also exists the case where two movable lens units share the zooming. In this case, however, when the zoom ratio is intended to be increased while the size is reduced, the power of each unit is likely to enhance. Aberrations are hence difficult to correct.

In the zoom finder of the first embodiment, at least three units, such as second, third and fourth units, are moved during the zooming, and each unit appropriately share thee zoom ratio. Accordingly, the amount of movement of each unit can be reduced even in the case of a high zoom ratio, and the entire lens length of the objective optical system can be shortened.

If Z2/Z goes beyond the upper limit of condition (3), the amount of movement of the second unit increases. This is not preferable since the entire lens length of the objective optical system cannot be shortened. If Z2/Z goes beyond the lower limit of condition (3), the amount of movement of the third unit increases. This is likewise not preferable since the entire lens length of the objective optical system cannot be shortened.

More preferably, condition (3) is as follows:

$$0.5 < Z2/Z < 0.7 \tag{3a}$$

If |Z4|/Z goes beyond the upper limit of condition (4) the amount of movement of the fourth unit increases. This is not preferable, since the entire lens length at the telephoto end tends to increase, and the aberration correction over the overall zoom range is difficult to achieve. If |Z4|/Z goes beyond the lower limit of condition (4), a zoom sharing ratio of the fourth unit decreases, and the amount of movement of another movable unit increases. Accordingly, the size of the objective optical system is difficult to reduce. More preferably, condition (4) is as follows:

$$0.05 < |Z4|/Z < 1.2 \tag{4a}$$

In the first embodiment, each lens unit in the objective optical system 10 is preferably composed of a single lens. Due to such a structure, the cost can be reduced, and a bright visual field can be obtained, since the number of lens surfaces is decreased and optical losses due to reflection at surfaces are accordingly reduced.

Furthermore, at least three lens surfaces of single lenses in the objective optical system are preferably aspherical surfaces with predetermined shapes. Due to such a structure, the aberration correction can be readily achieved, and a preferable object image can be readily observed.

In the first embodiment, it is preferable that the first stop ap1 is disposed on the object side of the second unit, the second stop ap2 is disposed on the object side of the third unit, and these stops are moved together with the respective units during the zooming. Due to such a structure, on-axis rays can be appropriately restricted, and ghost due to harmful light rays can be effectively prevented. In FIG. 1, stops ap1 and ap2 are arranged on the object sides of the respective units, but the location is not limited thereto. The stop can be disposed on the image side.

In this embodiment, all lenses of first, second, third and fourth units in the objective optical system can be formed of an acrylic acid resin. Further, a negative lens in at least one lens unit of first, second, third and fourth units is preferably formed of a material having a high dispersion, whose Abbe number vd is below 35. Due to such a structure, the on-axis chromatic aberration at the telephoto end can be decreased.

Numerical examples of the present invention will be described in the following. In each numerical example, i designates the order of a surface from the object side, Ri designates the radius of curvature of each surface, Di designates the member thickness or air gap between the i-th surface and the (i+1)-th surface, and Ni and vi respectively designate the index of refraction for the d-line and the Abbe number for the d-line.

The shape of the aspherical surface is expressed by the following x which is a displacement in a direction of the optical axis between a point of the aspherical surface at the height H from the optical axis and a standard point of the aspherical vertex, where R is the radius of curvature, K is conic coefficient, and B, C, D and E are aspherical coefficients, respectively.

$$x = (H^2/R)/\{1+[1-(1+k)(H/P)^2]^{1/2}\} + BH^4 + CH^6 + DH^8 + EH^{10}$$

In values of the aspherical coefficients, the notation [e+X] means [$\times 10^{+X}$], and the notation [e−X] means [$\times 10^{-X}$]. Table 1 lists the relationship between each of the above-discussed condition equations and values in each of the numerical examples.

THE FIRST NUMERICAL EXAMPLE

| 2ω = 51.0–13.0 | | | |
|---|---|---|---|
| *R1 = 12.295 | D1 = 2.10 | N1 = 1.491710 | v1 = 57.4 |
| R2 = −28.796 | D2 = variable | | |
| *R3 = −6.097 | D3 = 0.80 | N2 = 1.583060 | v2 = 30.2 |
| R4 = 8.481 | D4 = variable | | |
| R5 = 8.568 | D5 = 2.30 | N3 = 1.491710 | v3 = 57.4 |
| *R6 = −13.897 | D6 = variable | | |
| *R7 = 122.510 | D7 = 1.50 | N4 = 1.491710 | v4 = 57.4 |
| *R8 = −20.700 | D8 = variable | | |
| R9 = ∞ | D9 = 18.96 | N5 = 1.570900 | v5 = 33.8 |
| R10 = −21.000 | D10 = 0.10 | | |
| R11 = ∞ | D11 = 1.80 | | |
| R12 = ∞ | D12 = 24.00 | N6 = 1.570900 | v6 = 33.8 |
| R13 = ∞ | D13 = 1.00 | | |
| *R14 = 30.128 | D14 = 2.35 | N7 = 1.491710 | v7 = 57.4 |
| R15 = −13.366 | D15 = 15.00 | | |
| R16 = eye point | | | |

| | 2ω | | |
|---|---|---|---|
| Variable Distance | 51.0 | 27.8 | 13.0 |
| D2 | 1.64 | 4.13 | 6.61 |
| D4 | 9.92 | 6.20 | 0.71 |
| D6 | 1.24 | 0.89 | 2.07 |
| D8 | 1.00 | 2.58 | 4.41 |

Aspherical Coefficients

1st surface: k=3.13659e+00 B=−2.80462e−04 C=−1.67779e−06 D=−2.34950e−07 E=5.85222e−10
3rd surface: k=−4.18977e+00 B=−7.24499e−04 C=6.61639e−05 D=−1.76960e−06 E=−3.01010e−08
6th surface: k=−9.08894e+00 B=−1.05174e−05 C=6.08308e−06 D=−1.11651e−07 E=3.20774e−08
7th surface: k=−4.02912e+03 B=−1.33794e−04 C=3.10985e−05 D=1.47836e−06 E=4.770604e−08
8th surface: k=4.91884e+00 B=1.26436e−04 C=4.21859e−05 D=5.48117e−07 E=1.19014e−07
14th surface: k=0 B=−6.80353e−05 C=7.19512e−08 D=−1.22641e−08 E=0

THE SECOND NUMERICAL EXAMPLE

| 2ω = 54.1–13.9 | | | |
|---|---|---|---|
| *R1 = 12.228 | D1 = 2.10 | N1 = 1.491710 | v1 = 57.4 |
| R2 = −33.852 | D2 = variable | | |
| *R3 = −6.542 | D3 = 0.80 | N2 = 1.583060 | v2 = 30.2 |
| R4 = 8.699 | D4 = variable | | |
| R5 = 11.990 | D5 = 1.80 | N3 = 1.491710 | v3 = 57.4 |
| *R6 = −19.389 | D6 = variable | | |
| *R7 = 93.632 | D7 = 1.50 | N4 = 1.491710 | v4 = 57.4 |
| *R8 = −13.129 | D8 = variable | | |
| *R9 = 96.631 | D9 = 17.0 | N5 = 1.491710 | v5 = 57.4 |
| R10 = −34.891 | D10 = 0.40 | | |
| R11 = ∞ | D11 = 15.26 | N6 = 1.570900 | v6 = 33.8 |
| R10 = −34.891 | D10 = 0.40 | | |
| R12 = ∞ | D12 = 0.69 | | |
| R13 = ∞ | D13 = 1.76 | | |
| R14 = ∞ | D14 = 24.00 | N7 = 1.570900 | v7 = 33.8 |
| R15 = ∞ | D15 = 1.00 | | |
| *R16 = 30.128 | D16 = 2.35 | N8 = 1.491710 | v8 = 57.4 |
| R17 = −13.366 | D17 = 18.00 | | |
| R18 = eye point | | | |

| | 2ω | | |
|---|---|---|---|
| Variable Distance | 54.1 | 28.5 | 13.9 |
| D2 | 1.61 | 4.21 | 6.81 |
| D4 | 10.29 | 6.23 | 0.70 |
| D6 | 1.25 | 0.79 | 1.48 |
| D8 | 1.00 | 2.92 | 5.17 |

Aspherical Coefficients

1st surface: k=3.38583e+00 B=−2.34669e−04 C=−3.91147e−06 D=−2.57943e−07 E=1.52353e−09
3rd surface: k=−4.18977e+00 B=−7.24499e−04 C=6.61639e−05 D=−1.76960e−06 E=−3.01010e−08
6th surface: k=−3.81953e+00 B=5.37338e−04 C=3.17681e−06 D=−1.60342e−05 E=9.91925e−08
7th surface: k=−1.06774e+03 B=−3.28330e−05 C=2.13339e−05 D=1.57041e−06 E=5.75336e−08
8th surface: k=2.38081e+00 B=−3.47148e−06 C=3.01431e−05 D=5.48117e−07 E=1.19014e−07
9th surface: k=2.04410e+02 B=1.65801e−04 C=0 D=0 E=0
16th surface: k=0 B=−6.80353e−05 C=7.19512e−08 D=−1.22641e−08 E=0

THE THIRD NUMERICAL EXAMPLE

| 2ω = 48.5–13.0 | | | |
|---|---|---|---|
| *R1 = 15.070 | D1 = 2.10 | N1 = 1.491710 | v1 = 57.4 |
| R2 = −19.767 | D2 = variable | | |
| *R3 = −6.117 | D3 = 0.80 | N2 = 1.583060 | v2 = 30.2 |
| R4 = 9.113 | D4 = variable | | |
| R5 = 7.448 | D5 = 2.30 | N3 = 1.487490 | v3 = 70.2 |
| R6 = −19.201 | D6 = variable | | |
| *R7 = −3572.429 | D7 = 1.50 | N4 = 1.491710 | v4 = 57.4 |
| *R8 = −17.723 | D8 = variable | | |

-continued

| | | | |
|---|---|---|---|
| R9 = ∞ | D9 = 18.96 | N5 = 1.570900 | ν5 = 33.8 |
| R10 = −21.000 | D10 = 1.40 | | |
| R11 = ∞ | D11 = 0.96 | | |
| R12 = ∞ | D12 = 24.00 | N6 = 1.570900 | ν6 = 33.8 |
| R13 = ∞ | D13 = 1.00 | | |
| *R14 = 30.128 | D14 = 2.35 | N7 = 1.491710 | ν7 = 57.4 |
| R15 = −13.366 | D15 = 15.00 | | |
| R16 = eye point | | | |

| | 2ω | | |
|---|---|---|---|
| Variable Distance | 48.5 | 27.1 | 13.0 |
| D2 | 1.62 | 3.95 | 6.28 |
| D4 | 10.14 | 6.29 | 0.70 |
| D6 | 1.05 | 1.08 | 2.10 |
| D8 | 1.00 | 2.49 | 4.73 |

Aspherical Coefficients

1st surface: k=3.87936e+00 B=−1.97173e−04 C=−1.01428e−05 D=3.28190e−07 E=−6.80013e−09
3rd surface: k=−4.18977e+00 B=−7.24499e−04 C=6.61639e−05 D=−1.76960e−06 E=−3.01010e−08
7th surface: k=−6.33159e+13 B=−6.42896e−04 C=−7.05196e−06 D=−3.99370e−08 E=1.14261e−07
8th surface: k=−3.10318e+00 B=3.23296e−04 C=−6.75320e−06 D=5.48117e−07 E=1.19014e−07
14th surface: k=0 B=−6.80353e−05 C=7.19512e−08 D=−1.22641e−08 E=0

THE FOURTH NUMERICAL EXAMPLE

| | 2ω = 49.8–13.2 | | |
|---|---|---|---|
| *R1 = 12.979 | D1 = 2.10 | N1 = 1.491710 | ν1 = 57.4 |
| R2 = −29.078 | D2 = variable | | |
| *R3 = −4.897 | D3 = 0.80 | N2 = 1.524700 | ν2 = 56.2 |
| R4 = 7.004 | D4 = variable | | |
| R5 = 8.360 | D5 = 2.30 | N3 = 1.491710 | ν3 = 57.4 |
| *R6 = −14.307 | D6 = variable | | |
| *R7 = 84.135 | D7 = 1.50 | N4 = 1.491710 | ν4 = 57.4 |
| *R8 = −13.290 | D8 = variable | | |
| R9 = ∞ | D9 = 18.96 | N5 = 1.570900 | ν5 = 33.8 |
| R10 = −21.000 | D10 = 0.10 | | |
| R11 = ∞ | D11 = 1.00 | | |
| R12 = ∞ | D12 = 24.00 | N6 = 1.570900 | ν6 = 33.8 |
| R13 = ∞ | D13 = 1.00 | | |
| *R14 = 30.128 | D14 = 2.35 | N7 = 1.491710 | ν7 = 57.4 |
| R15 = −13.366 | D15 = 15.00 | | |
| R16 = eye point | | | |

| | 2ω | | |
|---|---|---|---|
| Variable Distance | 49.8 | 27.9 | 13.2 |
| D2 | 1.75 | 4.91 | 7.74 |
| D4 | 7.59 | 5.05 | 0.70 |
| D6 | 1.07 | 0.53 | 0.81 |
| D8 | 1.06 | 2.31 | 4.55 |

Aspherical Coefficients

1st surface: k=3.69518e+00 B=−2.78572e−04 C=−6.07861e−06 D=−5.30972e−08 E=5.41635e−10
3rd surface: k=−4.18977e+00 B=−9.29112e−04 C=6.02684e−05 D=4.76416e−06 E=−3.01010e−08
6th surface: k=−6.81309e+00 B=1.00261e−04 C=4.03944e−06 D=1.24993e−07 E=1.63045e−08
7th surface: k=−4.16861e+03 B=−3.98324e−04 C=7.02564e−05 D=−1.08825e−06 E=4.76967e−08
8th surface: k=3.29122e+00 B=−1.80395e−04 C=1.15839e−04 D=−3.40217e−06 E=1.19014e−07
14th surface: k=0 B=−6.80353e−05 C=7.19512e−08 D=−1.22641e−08 E=0

THE FIFTH NUMERICAL EXAMPLE

| | 2ω = 49.8–11.2 | | |
|---|---|---|---|
| *R1 = 13.091 | D1 = 1.90 | N1 = 1.524700 | ν1 = 56.2 |
| R2 = −36.227 | D2 = variable | | |
| R3 = ∞ | D3 = 0.80 | | |
| *R4 = −6.247 | D4 = 0.70 | N2 = 1.570900 | ν2 = 33.8 |
| R5 = 7.399 | D5 = variable | | |
| R6 = ∞ | D6 = 0.00 | | |
| R7 = 6.538 | D7 = 2.00 | N3 = 1.524700 | ν3 = 56.2 |
| *R8 = 63.125 | D8 = variable | | |
| *R9 = 44.427 | D9 = 14.0 | N4 = 1.524700 | ν4 = 56.2 |
| *R10 = −14.397 | D10 = variable | | |
| R11 = ∞ | D11 = 19.98 | N5 = 1.570900 | ν5 = 33.8 |
| R12 = −21.000 | D12 = 0.40 | | |
| R13 = ∞ | D13 = 1.00 | | |
| R14 = ∞ | D14 = 24.00 | N6 = 1.570900 | ν6 = 33.8 |
| R15 = ∞ | D15 = 1.00 | | |
| *R16 = 30.133 | D16 = 2.35 | N7 = 1.491710 | ν7 = 57.4 |
| R17 = −13.366 | D17 = 15.00 | | |
| R18 = eye point | | | |

| | 2ω | | |
|---|---|---|---|
| Variable Distance | 49.8 | 28.8 | 11.2 |
| D2 | 0.72 | 3.66 | 6.59 |
| D5 | 10.37 | 7.11 | 0.50 |
| D8 | 2.76 | 1.62 | 1.14 |
| D10 | 0.85 | 2.31 | 6.46 |

Aspherical Coefficients

1st surface: k=3.01508e+00 B=−1.32689e−04 C=−7.41345e−06 D=0 E=0
4th surface: k=−3.60035e+00 B=−3.81956e−04 C=6.21112e−05 D=0 E=0
8th surface: k=1.54383e+02 B=−3.39834e−04 C=1.92417e−05 D=0 E=0
9th surface: k=−7.53943e+02 B=−1.75501e−03 C=4.13783e−05 D=0 E=0
10th surface: k=5.03140e+00 B=−9.18887e−04 C=7.41331e−05 D=0 E=0
16th surface: k=0 B=−6.70500e−05 C=−2.31100e−07 D=0 E=0

THE SIXTH NUMERICAL EXAMPLE

| | 2ω = 49.6–15.7 | | |
|---|---|---|---|
| *R1 = 12.300 | D1 = 2.10 | N1 = 1.491710 | ν1 = 57.4 |
| R2 = −24.700 | D2 = variable | | |
| R3 = ∞ | D3 = 0.80 | | |
| *R4 = −5.650 | D4 = 0.80 | N2 = 1.583060 | ν2 = 30.2 |
| R5 = 8.500 | D5 = variable | | |
| R6 = ∞ | D6 = 0.00 | | |
| *R7 = 8.200 | D7 = 2.00 | N3 = 1.491710 | ν3 = 57.4 |
| R8 = −88.200 | D8 = variable | | |
| R9 = 24.840 | D9 = 1.80 | N4 = 1.491710 | ν4 = 57.4 |
| *R10 = −11.340 | D10 = variable | | |
| R11 = ∞ | D11 = 18.96 | N5 = 1.570900 | ν5 = 33.8 |
| R12 = −21.000 | D12 = 0.40 | | |
| R13 = ∞ | D13 = 1.00 | | |
| R14 = ∞ | D14 = 24.00 | N6 = 1.516330 | ν6 = 64.2 |
| R15 = ∞ | D15 = 0.00 | | |

-continued

| | | | |
|---|---|---|---|
| R16 = ∞ | D16 = 1.00 | | |
| *R17 = 31.853 | D17 = 2.15 | N7 = 1.4917100 | ν7 = 57.4 |
| R18 = −13.567 | D18 = 15.00 | | |
| R19 = eye point | | | |

| | 2ω | | |
|---|---|---|---|
| Variable Distance | 49.6 | 31.8 | 15.7 |
| D2 | 1.20 | 2.58 | 3.96 |
| D5 | 9.13 | 6.22 | 1.12 |
| D8 | 1.97 | 2.18 | 1.20 |
| D10 | 0.70 | 2.02 | 6.73 |

Aspherical Coefficients

1st surface: k=0 B=−5.29100e−05 C=−8.29700e−07 D=0 E=0
4th surface: k=0 B=1.90300e−03 C=4.24000e−07 D=0 E=0
7th surface: k=0 B=−1.88700e−04 C=6.49800e−06 D=0 E=0
10th surface: k=0 B=7.59900e−04 C=−2.77700e−06 D=4.03100e−07 E=0
17th surface: k=0 B=−5.41700e−05 C=−7.97300e−07 D=1.24000e−08 E=0

THE SEVENTH NUMERICAL EXAMPLE

| 2ω = 59.0–28.5 | | | |
|---|---|---|---|
| *R1 = 68.714 | D1 = 1.80 | N1 = 1.491710 | ν1 = 57.4 |
| *R2 = −7.177 | D2 = 0.00 | | |
| R3 = ∞ | D3 = variable | | |
| *R4 = −4.489 | D4 = 0.80 | N2 = 1.583060 | ν2 = 30.2 |
| *R5 = 8.497 | D5 = 0.25 | | |
| R6 = ∞ | D6 = variable | | |
| *R7 = 14.869 | D7 = 1.10 | N3 = 1.491710 | ν3 = 57.4 |
| R8 = −76.459 | D8 = 0.00 | | |
| R9 = ∞ | D9 = variable | | |
| R10 = ∞ | D10 = 0.00 | | |
| *R11 = 10.736 | D11 = 2.50 | N4 = 1.491710 | ν4 = 57.4 |
| *R12 = −5.629 | D12 = variable | | |
| R13 = ∞ | D13 = 14.68 | N5 = 1.570900 | ν5 = 33.8 |
| R14 = −19.000 | D14 = 0.50 | | |
| R15 = ∞ | D15 = 1.00 | | |
| R16 = ∞ | D16 = 24.00 | N6 = 1.570900 | ν6 = 33.8 |
| R17 = ∞ | D17 = 0.00 | | |
| R18 = ∞ | D18 = 0.42 | | |
| *R19 = 27.633 | D19 = 2.35 | N7 = 1.491710 | ν7 = 57.4 |
| R20 = −13.366 | D20 = 15.00 | | |
| R21 = eye point | | | |

| | 2ω | | |
|---|---|---|---|
| Variable Distance | 59.0 | 45.3 | 28.5 |
| D3 | 1.05 | 1.41 | 2.26 |
| D6 | 4.88 | 2.79 | 0.25 |
| D9 | 0.57 | 1.30 | 0.96 |
| D12 | 0.50 | 1.50 | 3.53 |

Aspherical Coefficients

1st surface: k=0 B=1.73829e−04 C=1.84069e−05 D=−2.46096e−06 E=2.61857e−08
2nd surface: k=−7.11313e+00 B=−4.56402e−05 C=−1.48987e−05 D=0 E=0
4th surface: k=−3.85960e+00 B=4.40420e−03 C=−2.59121e−03 D=5.16464e−04 E=−3.35549e−05
5th surface: k=−3.76271e+00 B=2.76606e−03 C=−5.68207e−04 D=−1.06891e−04 E=3.293094e−05
7th surface: k=1.59677e+01 B=−5.07010e−04 C=−1.51211e−05 D=−1.26780e−05 E=5.05794e−07
11th surface: k=1.75504e+00 B=−1.76532e−03 C=−9.63210e−07 D=−6.73506e−07 E=−1.59350e−07
12th surface: k=1.67987e−01 B=8.34855e−04 C=−6.61668e−05 D=5.03014e−06 E=−3.24323e−07
19th surface: k=1.02530e−01 B=−8.46894e−05 C=−2.01808e−07 D=0 E=0

TABLE 1

| Cond. | 1st N.E. | 2nd N.E. | 3rd N.E. | 4th N.E. | 5th N.E. | 6th N.E. | 7th N.E. |
|---|---|---|---|---|---|---|---|
| (1) $f_1/F_{ow}$ | 2.056 | 2.406 | 2.031 | 2.187 | 2.201 | 1.980 | 2.067 |
| (2) $f_3/F_{ow}$ | 1.287 | 1.992 | 1.296 | 1.309 | 1.627 | 1.788 | 3.945 |
| (3) $Z_2/Z$ | 0.640 | 0.654 | 0.614 | 0.689 | 0.579 | 0.521 | 0.602 |
| (4) $|Z_4|/Z$ | 0.244 | 0.129 | 0.246 | 0.196 | 0.050 | 0.343 | 1.112 |

Cond. denotes "Condition", and
N.E. denotes "Numerical Example"

As discussed in the above embodiment, can be achieved a finder of a real-image type in which the entire finder optical system can be made small and a preferable finder image can be observed from the wide-angle end to the telephoto end even when the zoom ratio is high, say over three, by appropriately setting the construction of the objective optical system and the units movable during the zooming.

Figure 18:
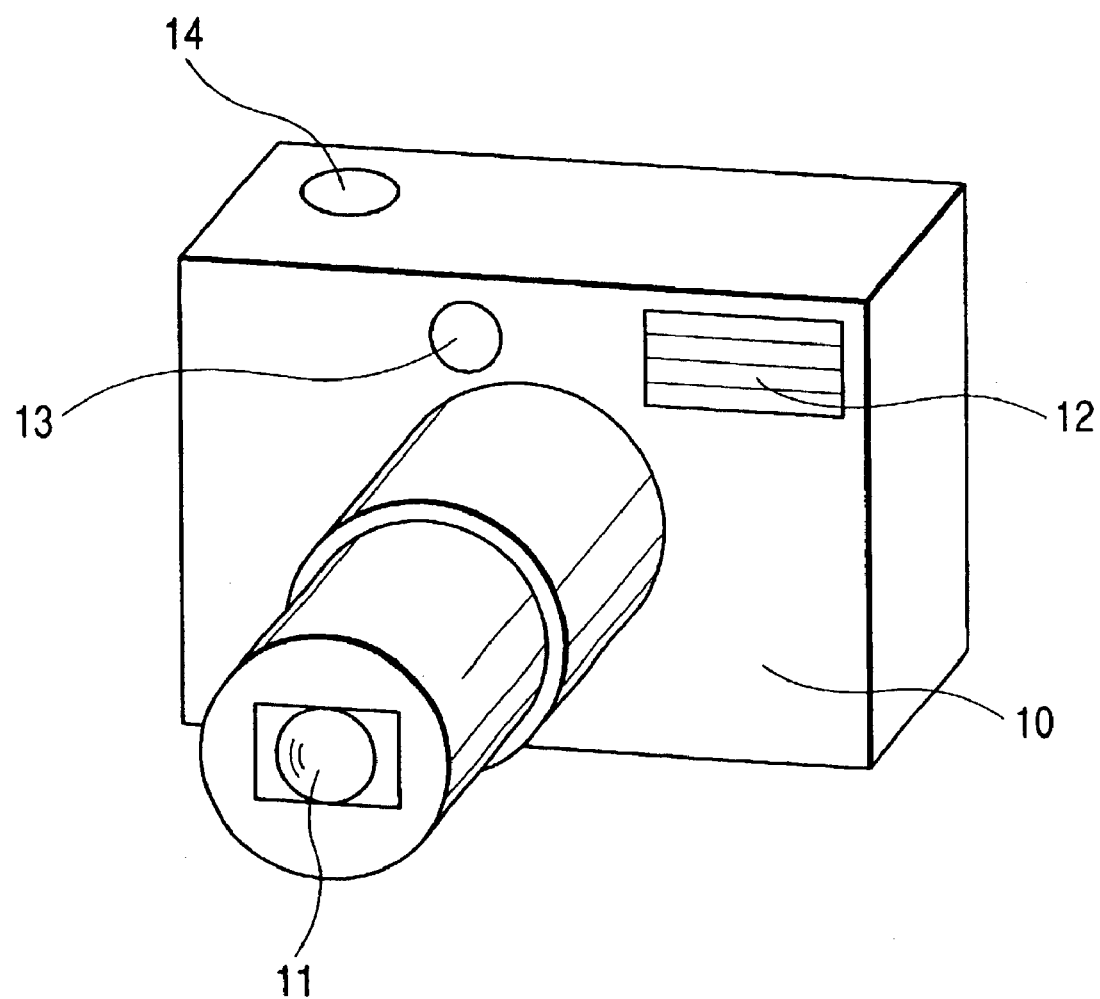
FIG. 18 is a schematic view illustrating a main portion of an optical apparatus with a finder of a second embodiment according to the present invention.

A second embodiment of the present invention is now discussed. The second embodiment is a digital camera employing a finder. Referring to FIG. 18, there are shown a digital camera 10, a photo-taking optical system 11 composed of a zoom lens, a stroboscope 12 built in the camera 10, an external finder 13 of the present invention, and a shutter button 14. Optical axes of the photo-taking optical system 11 and the finder 13 are different from each other. The visual field of the finder 13 is set such that the same range as the photo-taking range of the photo-taking optical system 11 can be observed. The photo-taking optical system 11 forms the image of an object on a solid-state image sensor (not shown), such as CCD, or CMOS. The pickup element receives the image formed by the photo-taking optical system 11, and converts it to electrical data. The image data of the object converted to the electrical data is stored in a memory (not shown).

A compact optical apparatus having high optical performance is thus achieved by incorporating the finder of the present invention into an optical apparatus such as a digital camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A finder comprising:
   an objective optical system, said objective optical system including, from an object side to an image side, a first lens unit having positive power, a second lens unit having negative power, a third lens unit having positive power, and a fourth lens unit having positive power; and an eyepiece optical system for directing an image formed by said objective optical system to an eye of an observer;

wherein, when zooming is performed from a wide-angle end to a telephoto end, said second lens unit is moved toward the image side, said third lens unit is moved toward the object side, and said fourth lens unit is moved such that an air space between said fourth lens unit and said third lens unit is changed; and wherein the condition of 1.0<f1/Fow<3.0 holds, wherein f1 is the focal length of said first lens unit, and Fow is the focal length of said objective optical system at the wide-angle end.

2. A finder comprising:

an objective optical system said objective optical system including, from an object side to an image side, a first lens unit having positive power, a second lens unit having negative power, a third lens unit having positive power, and a fourth lens unit having positive power; and an eyepiece optical system for directing an image formed by said objective optical system to an eye of an observer;

wherein, when zooming is performed from a wide-angle end to a telephoto end, said second lens unit is moved toward the image side, said third lens unit is moved toward the object side, and said fourth lens unit is moved such that an air space between said fourth lens unit and said third lens unit is changed; and wherein the condition of 0.8<f3/Fow holds, wherein f3 is the focal length of said third lens unit, and Fow is the focal length of said objective optical system at the wide-angle end.

3. A finder comprising:

an objective optical system, said objective optical system including, from an object side to an image side, a first lens unit having positive power, a second lens unit having negative power, a third lens unit having positive power, and a fourth lens unit having positive power; and an eyepiece optical system for directing an image formed by said objective optical system to an eye of an observer;

wherein, when zooming is performed from a wide-angle end to a telephoto end, said second lens unit is moved toward the image side, said third lens unit is moved toward the object side, and said fourth lens unit is moved such that an air space between said fourth lens unit and said third lens unit is changed; and wherein the condition of 0.3<Z2/Z<0.9 holds, wherein Z is the zoom ratio of said objective optical system, and Z2 is the zoom ratio of said second lens unit.

4. A finder comprising:

an objective optical system, said objective optical system including, from an object side to an image side, a first lens unit having positive power, a second lens unit having negative power, a third lens unit having positive power, and a fourth lens unit having positive power; and an eyepiece optical system for directing an image formed by said objective optical system to an eye of an observer;

wherein, when zooming is performed from a wide-angle end to a telephoto end, said second lens unit is moved toward the image side, said third lens unit is moved toward the object side, and said fourth lens unit is moved such that an air space between said fourth lens unit and said third lens unit is changed; and wherein the condition of 0.05<|Z4|/Z<2.25 holds, wherein Z is the zoom ratio of said objective optical system, and Z4 is the zoom ratio of said fourth lens unit.

5. A finder according to claim 1, wherein said objective optical system has three or more than three aspherical surfaces.

6. A finder according to claim 1, wherein at least one of said second lens unit and said third lens unit is equipped with a stop movable together with said lens unit.

7. A finder according to claim 1, wherein said objective optical system has positive power.

8. A finder according to claim 1, wherein said first lens unit remains stationary.

9. A camera comprising:

a photo-taking optical system; and a finder, an optical axis of said finder being different from an optical axis of said photo-taking optical system, and said finder including an objective optical system which includes, from an object side to an image side, a first lens unit having positive power, a second lens unit having negative power, a third lens unit having positive power, and a fourth lens unit having positive power; and an eyepiece optical system for directing an image formed by said objective optical system to an eve of an observer; wherein, when zooming is performed from a wide-angle end to a telephoto end, said second lens unit is moved toward the image side, said third lens unit is moved toward the object side, and said fourth lens unit is moved such that an air space between said fourth lens unit and said third lens unit is changed and wherein the condition of 1.0<f1/Fow<3.0 holds, wherein f1 is the focal length of said first lens unit, and Fow is the focal length of said objective optical system at the wide-angle end.

10. A camera comprising:

a photo-taking optical system;

a finder, an optical axis of said finder being different from an optical axis of said photo-taking optical system, and said finder including an objective optical system which includes, from an object side to an image side, a first lens unit having positive power, a second lens unit having negative power, a third lens unit having positive power, and a fourth lens unit having positive power; and an eyepiece optical system for directing an image formed by said objective optical system to an eve of an observer; wherein, when zooming is performed from a wide-angle end to a telephoto end, said second lens unit is moved toward the image side, said third lens unit is moved toward the object side, and said fourth lens unit is moved such that an air space between said fourth lens unit and said third lens unit is changed; and wherein the condition of 1.0<f1/Fow<3.0 holds, wherein f1 is the focal length of said first lens unit, and Fow is the focal length of said objective optical system at the wide-angle end; and a solid state image sensor for receiving an image formed by said photo-taking optical system.

11. A finder according to claim 2, further comprising:

a first prism disposed between the objective optical system and an image plane of the objective optical system; and a second prism disposed between said image plane and the eyepiece optical system.

* * * * *

UNITED STATES PATENT AND TRADEMARK OFFICE
CERTIFICATE OF CORRECTION

PATENT NO. : 6,724,992 B2
DATED : April 20, 2004
INVENTOR(S) : Kato et al.

It is certified that error appears in the above-identified patent and that said Letters Patent is hereby corrected as shown below:

Column 7,
Line 65, delete "$0.05<|Z4|Z<2.25$" and insert therefore -- $0.05<|Z4|/Z<2.25$ --.

Signed and Sealed this

Twenty-ninth Day of November, 2005

JON W. DUDAS
*Director of the United States Patent and Trademark Office*